United States Patent
Zhou

(10) Patent No.: US 11,832,221 B2
(45) Date of Patent: Nov. 28, 2023

(54) INFORMATION RETRANSMISSION METHOD AND APPARATUS, BASE STATION, AND TERMINAL

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 376 days.

(21) Appl. No.: 17/284,435

(22) PCT Filed: Oct. 16, 2018

(86) PCT No.: PCT/CN2018/110477
§ 371 (c)(1),
(2) Date: Apr. 9, 2021

(87) PCT Pub. No.: WO2020/077533
PCT Pub. Date: Apr. 23, 2020

(65) Prior Publication Data
US 2021/0352644 A1 Nov. 11, 2021

(51) Int. Cl.
*H04W 72/044* (2023.01)
*H04L 1/08* (2006.01)
(Continued)

(52) U.S. Cl.
CPC ............ *H04W 72/044* (2013.01); *H04L 1/08* (2013.01); *H04W 72/20* (2023.01); *H04W 74/0808* (2013.01)

(58) Field of Classification Search
CPC ............... H04W 72/044; H04W 72/20; H04W 74/0808; H04W 72/542; H04W 74/0816;
(Continued)

(56) References Cited

U.S. PATENT DOCUMENTS 10,051,617 B2  8/2018  Nory et al.
2016/0278048 A1  9/2016  Nory et al.
(Continued)

FOREIGN PATENT DOCUMENTS

CN  104202821 A  12/2014
CN  105611637 A  5/2016
(Continued)

OTHER PUBLICATIONS

ISA State Intellectual Property Office of the People's Republic of China, Written Opinion of the International Searching Authority Issued in Application No. PCT/CN2018/110477, dated Jun. 28, 2019, WIPO, (9p).
(Continued)

*Primary Examiner* — Kwang B Yao
*Assistant Examiner* — Syed M Bokhari
(74) *Attorney, Agent, or Firm* — Arch & Lake LLP

(57) ABSTRACT

Information retransmission methods and apparatus, base stations, and terminals are provided. The method includes: determining a retransmission alternative resource for a shared user equipment (UE) according to preset grant-free uplink (GUL) transmission configuration information, where the GUL transmission configuration information comprises at least a time-frequency range associated with a GUL transmission period and a time-frequency location of a periodic uplink transmission resource, and the shared UE and other UE share the same periodic uplink transmission resource in an unlicensed spectrum to implement automatic uplink transmission; generating alternative resource configuration information according to a time-frequency range of the retransmission alternative resource; and sending the alternative resource configuration information to the shared UE, such that the shared UE performs automatic retransmission on the retransmission alternative resource according
(Continued)

For each of the at least two preset GUL transmission periods, determine a time interval between a starting moment of a conventional transmission resource within the reference GUL transmission period and an ending moment of an LBT detection space within the GUL transmission period of the shared UE — 111

Determine a preset GUL transmission period, in which a conventional transmission resource related to the smallest time interval is located, as a target GUL transmission period — 112

Determine the first type of retransmission alternative resource for the shared UE according to a conventional transmission resource within the target GUL transmission period — 113 to the alternative resource configuration information after the shared UE fails listen before talk (LBT) detection.

17 Claims, 15 Drawing Sheets

(51) Int. Cl.
  *H04W 74/08* (2009.01)
  *H04W 72/20* (2023.01)
(58) Field of Classification Search
  CPC ....... H04L 1/08; H04L 1/1893; H04L 1/1896; H04L 1/1887; H04L 1/1812
  USPC .......................................................... 370/330
  See application file for complete search history.

(56) References Cited

U.S. PATENT DOCUMENTS

| | | | |
|---|---|---|---|
| 2018/0175973 A1* | 6/2018 | Rosa | ..................... H04L 1/1812 |
| 2018/0367282 A1 | 12/2018 | Li et al. | |
| 2019/0059001 A1* | 2/2019 | Yerramalli | ............ H04L 1/0073 |
| 2019/0075581 A1* | 3/2019 | Salem | ............... H04W 72/1268 |
| 2020/0213043 A1* | 7/2020 | Hooli | .................... H04W 72/04 |

FOREIGN PATENT DOCUMENTS

| | | |
|---|---|---|
| CN | 106658742 A | 5/2017 |
| CN | 106921474 A | 7/2017 |
| CN | 107431597 A | 12/2017 |
| CN | 107548070 A | 1/2018 |
| CN | 107667565 A | 2/2018 |
| CN | 107743695 A | 2/2018 |
| KR | 20170127634 A | 11/2017 |

OTHER PUBLICATIONS

International Search Report issued in PCT Application No. PCT/CN2018/110477 dated Jun. 28, 2019 with English translation, (4p).
Huawei, HiSilicon,"HARQ Enhancements in NR Unlicensed", 3GPP TSG RAN WG1 Meeting #94, Gothenburg, Sweden, R1-1808063, Aug. 20-24, 2018, (8p).

* cited by examiner

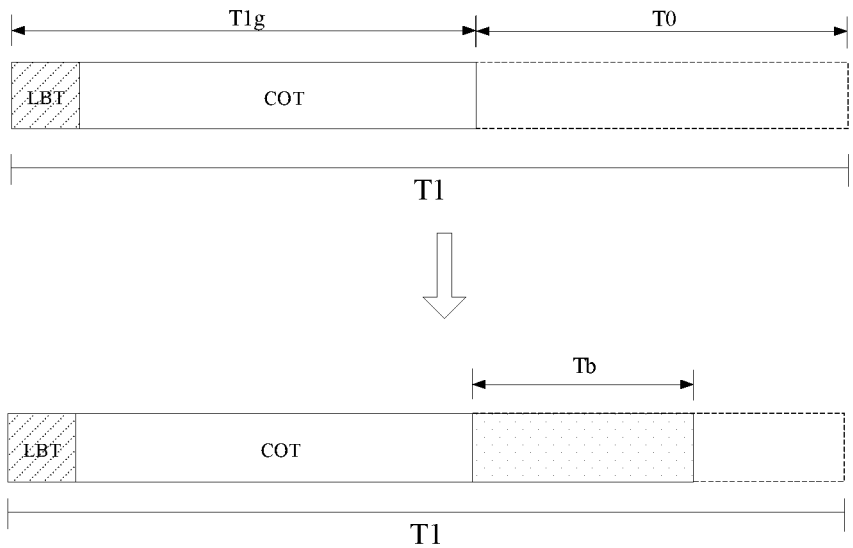

FIG. 3-2

| For each of the at least two preset GUL transmission periods, determine a time interval between a starting moment of a conventional transmission resource within the reference GUL transmission period and an ending moment of an LBT detection space within the GUL transmission period of the shared UE | — 111 |

| Determine a preset GUL transmission period, in which a conventional transmission resource related to the smallest time interval is located, as a target GUL transmission period | — 112 |

| Determine the first type of retransmission alternative resource for the shared UE according to a conventional transmission resource within the target GUL transmission period | — 113 |

FIG. 4

INFORMATION RETRANSMISSION METHOD AND APPARATUS, BASE STATION, AND TERMINAL

CROSS REFERENCE TO RELATED APPLICATIONS

The present application is the U.S. national phase of PCT Application No. PCT/CN2018/110477, filed on Oct. 16, 2018, which is incorporated herein by reference in its entirety for all purposes.

TECHNICAL FIELD

The present disclosure relates to the field of communication technology, and in particular, to an information retransmission method and apparatus, a base station, and a terminal.

BACKGROUND

As mobile communication networks gradually evolve to 5G NR (New Radio) systems, mobile communication systems deploy many new frequency resources for information transmission, and the adoption of high-frequency spectrum is a feature of new mobile communication systems, such as the 5G NR systems. Another feature of new mobile communication systems deploying new spectrums is the extensive use of unlicensed spectrum resources for transmission, such as 2.4 GHz, 5 GHz, and other frequency spectrum resources. When a base station and a terminal work in an unlicensed spectrum, the base station and the terminal need to follow the same channel avoidance mechanism as Wi-Fi systems, i.e., an LBT (Listen Before Talk) mechanism, because they need to work together with other systems such as Wi-Fi.

In an unlicensed spectrum, after a terminal successfully detects a transmission opportunity using the LBT mechanism, the terminal will occupy a channel for a period of time in accordance with Maximum Channel Occupancy Time (MCOT) or Channel Occupancy Time (COT) which is granted by a base station.

In the 5G NR, a Grant-free UpLink (GUL) transmission, or known as Autonomous UL (AUL) transmission, mechanism is also introduced for utilization of unlicensed spectrum resources. Under this GUL transmission mechanism, a base station does not schedule an uplink resource for each piece of uplink transmission of a terminal; instead, the base station schedules a GUL transmission resource for the terminal, e.g., the base station configures a transmission period for a resource available in an unlicensed spectrum, so that the terminal automatically performs uplink transmission using an uplink transmission resource corresponding to the transmission period. In other words, the GUL transmission is uplink transmission that does not require uplink scheduling every time.

Under the grant-free transmission mechanism, when multiple User Equipments (UEs) contend for the same shared uplink transmission resource, if one or more of them fail to contend for the resource, i.e., corresponding LBT detection fails, a base station is to schedule a resource other than the resource corresponding to the GUL transmission period for each LBT detection-failed UE as a retransmission resource for data retransmission, which results in relatively large transmission latency for the LBT detection-failed UE. Because the base station is to schedule the retransmission resource for each LBT detection failure of each UE, a large amount of scheduling signaling is required.

SUMMARY

To overcome the problems in the related art, the embodiments of the present disclosure provide information retransmission methods and apparatuses, base stations, and terminals, which can effectively shorten the retransmission latency in grant-free transmission mechanism and reduce scheduling signaling overhead.

According to a first aspect of the embodiments of the present disclosure, an information retransmission method is provided, which is applicable to a base station, and the method includes: determining a retransmission alternative resource for a shared UE according to preset GUL transmission configuration information, where the GUL transmission configuration information includes at least a time-frequency range associated with a GUL transmission period and a time-frequency location of a periodic uplink transmission resource, and the shared UE and other UE share a same periodic uplink transmission resource in an unlicensed spectrum to implement automatic uplink transmission; generating alternative resource configuration information according to a time-frequency range of the retransmission alternative resource, where the alternative resource configuration information informs the shared UE about a time-frequency location of the retransmission alternative resource; and sending the alternative resource configuration information to the shared UE, such that the shared UE performs automatic retransmission on the retransmission alternative resource according to the alternative resource configuration information after the shared UE fails LBT detection.

According to a second aspect of the embodiments of the present disclosure, an information retransmission method is provided, which is applicable to a shared UE, and where the shared UE and other UEs share a same periodic uplink transmission resource in an unlicensed spectrum to implement automatic uplink transmission.

The method includes: receiving alternative resource configuration information from a base station, where the alternative resource configuration information informs the shared UE about a time-frequency location of a retransmission alternative resource; determining a time-frequency range of the retransmission alternative resource according to the alternative resource configuration information; and performing automatic retransmission by using the retransmission alternative resource after LBT detection fails on a shared uplink transmission resource in a GUL transmission period.

According to a third aspect of the embodiments of the present disclosure, a base station is provided. The base station includes: a processor and a memory for storing instructions executable by the processor. The processor is configured to: determine a retransmission alternative resource for a shared UE according to preset GUL transmission configuration information, where the GUL transmission configuration information includes at least a time-frequency range associated with a GUL transmission period and a time-frequency location of a periodic uplink transmission resource, and the shared UE and other UE share a same periodic uplink transmission resource in an unlicensed spectrum to implement automatic uplink transmission; generate alternative resource configuration information according to a time-frequency range of the retransmission alternative resource, where the alternative resource configuration information informs the shared UE about a time-frequency location of the retransmission alternative resource; and send the alternative resource configuration information to the shared UE, such that the shared UE performs automatic retransmission on the retransmission alternative resource according to the alternative resource configuration information after the shared UE fails LBT detection.

According to a fourth aspect of the embodiments of the present disclosure, a shared terminal is provided. The shared terminal includes a processor and a memory for storing instructions executable by the processor. The processor is configured to: receive alternative resource configuration information from a base station, where the alternative resource configuration information informs the shared terminal about a time-frequency location of a retransmission alternative resource, and the shared terminal and other terminal sharing a same periodic uplink transmission resource in an unlicensed spectrum to implement automatic uplink transmission, and the shared terminal; determine a time-frequency range of the retransmission alternative resource according to the alternative resource configuration information; and perform automatic retransmission by using the retransmission alternative resource after LBT detection fails on a shared uplink transmission resource in a GUL transmission period.

The technical solutions provided by the embodiments of the present disclosure may include the following beneficial effects.

In the embodiments of the present disclosure, the base station can configure the retransmission alternative resource for the shared UE, such that the shared UE can automatically retransmit uplink information using the retransmission alternative resource configured by the base station after the LBT detection failure on the shared uplink transmission resource in the GUL transmission period. Thus, the base station is not required to separately schedule a retransmission resource for each LBT detection failure event of the shared UE on a shared uplink transmission resource, thereby effectively shortening uplink retransmission latency of the shared UE and reducing retransmission scheduling signaling overhead.

It should be understood that the above general description and the following detailed description are merely exemplary and explanatory, and do not limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 3-1 is a schematic diagram illustrating another application scenario of information retransmission according to an embodiment of the present disclosure.

FIG. 3-2 is a schematic diagram illustrating another application scenario of information retransmission according to an embodiment of the present disclosure.

FIG. 4 is a flowchart illustrating another information retransmission method according to an embodiment of the present disclosure.

FIGS. 6-1 to 6-3 are schematic diagrams illustrating application scenarios of information retransmission according to embodiments of the present disclosure.

DETAILED DESCRIPTION OF THE EMBODIMENTS

Figure 1:
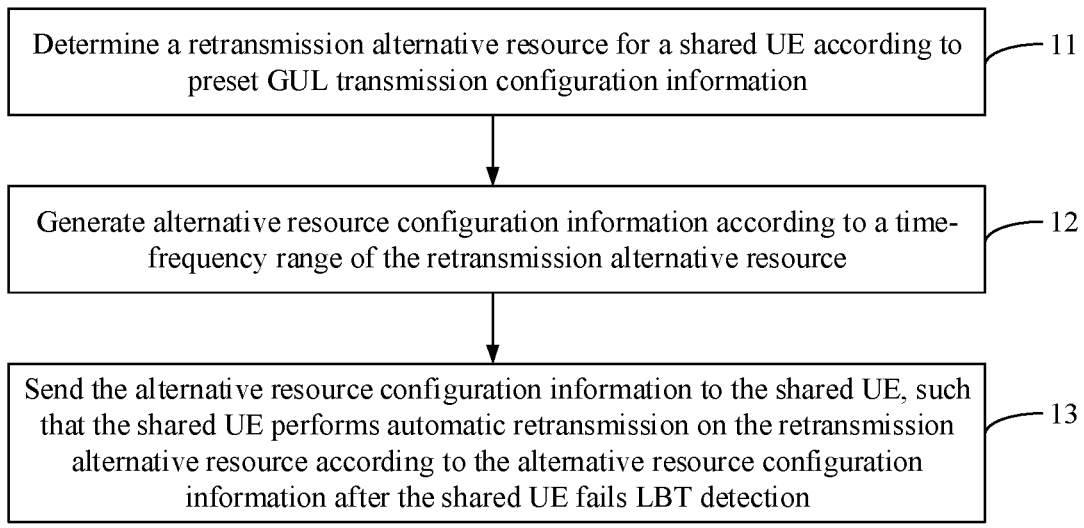
FIG. 1 is a flowchart illustrating an information retransmission method according to an embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the word "if" as used herein may be interpreted as "when" or "upon" or "in response to determining".

The execution subject of the present disclosure includes: a base station and a terminal (e.g., UE) in mobile communication networks, such as 4G LTE (Long Term Evolution), LTE-NR interworking, 5G NR, and other systems. The base station may be a base station with a large-scale antenna array, a sub-base station with a large-scale antenna array, etc. The UE may be a user terminal, a user node, a mobile terminal, a tablet computer, etc. In a specific implementation process, the base station and the UE are independent of each other, and are communicated to each other at the same time, so as to implement technical solutions provided by the present disclosure together.

An application scenario of the present disclosure is: a base station configures at least two UEs with the same GUL transmission resource, such that multiple UEs can use the same grant-free periodic uplink transmission resource, i.e., a shared uplink transmission resource, to implement automatic uplink transmission. In the present disclosure, UEs configured with the same GUL transmission configuration information are referred to as shared UEs. Uplink transmission means that a UE sends information to a base station. When two or more shared UEs all need to use the same periodic uplink transmission resource, that is, a current shared uplink transmission resource, for automatic uplink transmission, each of the two or more shared UEs is to perform LBT detection on the current shared uplink transmission resource firstly. In a case that the current shared uplink transmission resource is idle, only one shared UE can succeed in the LBT detection and then perform automatic uplink transmission; all other shared UEs fail in the LBT detection and cannot use the current shared uplink transmission resource for uplink transmission. Thus, LBT detection-failed shared UE is to retransmit information to the base station using other unlicensed spectrum resources.

In the present disclosure, when a shared UE starts to perform LBT detection on a shared uplink transmission resource, it is considered that the shared UE has initiated automatic uplink transmission. Therefore, a process of information transmission that starts again after failed LBT detection is a process of information retransmission.

LBT detection: in a wireless communication system, when an information sender, such as a UE, is to transmit information using a resource in an unlicensed spectrum, the information sender first performs clear channel detection in the unlicensed spectrum, and if a detection result meets a preset clear channel assessment rule, the information sender determines that the LBT detection is successful. For example, if a number of idle unit time-frequency resources detected on a preset LBT detection space is greater than or equal to CCA (Clear Channel Assessment) measurement value N, which is a preset value for determining channel idleness, the LBT detection is determined to be successful. Thus, a current channel is determined to be in an idle state within a preset duration, a corresponding COT window is determined, and data can be sent within the COT window, where the COT window may be referred to as a transmission space. Conversely, if the detection result does not meet the preset clear channel assessment rule, the LBT detection is determined to be failed.

A shared UE with successful LBT detection can occupy the channel for a period of time for information transmission in accordance with system agreed MCOT or COT.

Based on this, the present disclosure provides an information retransmission method. Referring to FIG. 1, a flowchart of an information retransmission method according to an embodiment, the method can be applicable to a base station, and the method can include the following steps.

At step 11, a retransmission alternative resource is determined for a shared UE according to preset GUL transmission configuration information. The GUL transmission configuration information includes at least a time-frequency range associated with a GUL transmission period and a time-frequency location of a periodic uplink transmission resource.

The retransmission alternative resource is used for automatic uplink retransmission by a shared UE upon encountering failed automatic uplink transmission.

The preset GUL transmission configuration information includes at least: GUL transmission configuration information of the shared UE itself, and the preset GUL transmission configuration information may further include: GUL transmission configuration information of a non-shared UE, which will be described in detail later in conjunction with specific examples. The non-shared UE refers to a UE that does not share the same periodic uplink transmission resource with the current shared UE.

In the present disclosure, the base station can determine a retransmission alternative resource for one or more shared UEs according to the preset GUL transmission configuration information.

The implementation of step 11 is illustrated below using a shared UE as an example. Assume that shared terminal group G1 includes three shared UEs: UE 1, UE 2, and UE 3. In the present disclosure, the base station may determine a retransmission alternative resource for a shared UE e.g., UE 1 within shared terminal group G1 by using at least one of the following ways.

In a first way, the base station configures the retransmission alternative resource for a shared terminal group using a conventional transmission resource in a preset GUL transmission period.

Step 11 may be step A: a first type of retransmission alternative resource is determined for the shared UE according to the conventional transmission resource in the preset GUL transmission period.

In the present disclosure, the base station determines the retransmission alternative resource for the shared UE according to the conventional transmission resource in the configured GUL transmission period. Such retransmission alternative resource may be referred to as the first type of retransmission alternative resource.

Figure 2:
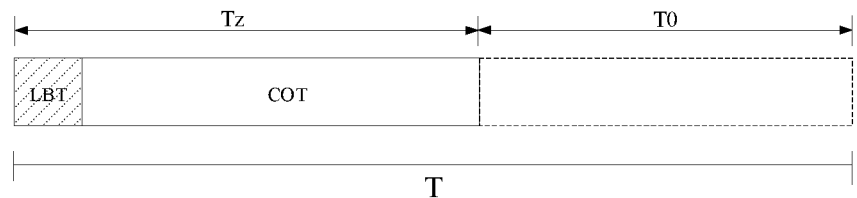
FIG. 2 is a schematic diagram illustrating an application scenario of information retransmission according to an embodiment of the present disclosure.

A structure of a GUL transmission period is shown in FIG. 2, where grant-free transmission period T includes: periodic uplink transmission resource Tz for automatic uplink transmission and conventional transmission resource T0.

In the present disclosure, the conventional transmission resource refers to a transmission resource within GUL transmission period T and not allocated to a specified UE, that is, a transmission resource other than the periodic uplink transmission resource in the GUL transmission period. In general, various devices such as Bluetooth devices, Wi-Fi devices, mobile terminals, etc., can freely contend for the conventional transmission resource.

A periodic uplink transmission resource refers to as an uplink transmission resource allocated to a specific UE in period T, where the specific UE may be one UE or two or more shared UEs.

As shown in FIG. 2, periodic uplink transmission resource Tz includes: an LBT detection space and a transmission space, and the transmission space may also be referred to as a COT space.

A UE performs LBT detection on the LBT detection space, and transmits information after the LBT detection is successful.

In the present disclosure, the above step A may include two implementations.

Implementation 1: the first type of retransmission alternative resource is determined according to a conventional transmission resource in a GUL transmission period of the shared UE.

Figures 1, 3:
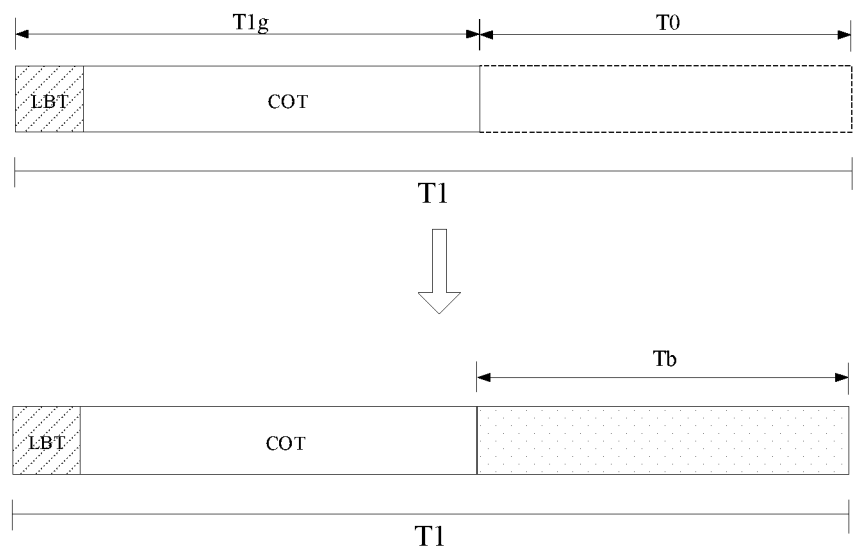

Referring to FIG. 3-1, which is a schematic diagram illustrating another scenario of retransmitting information according to an embodiment, T1 is a GUL transmission period of shared terminal group G1, T1g indicates a time domain range of the periodic uplink transmission resource that can be shared by UE 1 to UE 3 within the GUL transmission period, T0 indicates a time domain range of a conventional transmission resource within GUL transmission period T1; and Tb indicates a time domain range of the first type of retransmission alternative resource.

In an embodiment of the present disclosure, the base station may configure all conventional transmission resource within T1 as the first type of retransmission alternative resource for UE 1.

In another embodiment of the present disclosure, the base station may also determine part of the conventional transmission resource within GUL transmission period T1 as the first-type of retransmission alternative resource for UE 1. Exemplarily, FIG. 3-2 may be taken as an example, which is a schematic diagram illustrating another scenario of retransmitting information according to an embodiment.

In the embodiments of the present disclosure, the base station configures the conventional transmission resource in the GUL transmission period of the shared UE itself as the first type of retransmission alternative resource of the shared UE, and when configuration information on the retransmission alternative resource is informed to the shared UE, the signaling overhead can be reduced because a frequency domain range of the first type of retransmission alternative resource is not necessary to be informed to the shared UE.

Implementation 2: the base station may determine the first type of retransmission alternative resource based on a conventional transmission resource in a GUL transmission period of a non-shared UE.

In the present disclosure, the preset GUL transmission configuration information may include: transmission configuration information about at least two GUL transmission periods. One of the t least two GUL transmission periods is a GUL transmission period of the shared UE, such as UE 1 itself, e.g., a first GUL transmission period; and the other GUL transmission period is a GUL transmission period of anon-shared UE, which is configured by the base station for UE 1 and may be referred to as a second GUL transmission period in the present disclosure. The second GUL transmission period may be a GUL transmission period originally configured by the base station to other UEs or other shared terminal groups. A correspondence between object to be configured and preset GUL transmission period may be shown in Table 1:

TABLE 1

| Object to be Configured | Period Name |
| --- | --- |
| Shared UE | First GUL transmission period |
| Non-shared UE | Second GUL transmission period |

Referring to FIG. 4, a flowchart illustrating another information retransmission method according to an embodiment, step A may include the following.

At step 111, a time interval between a starting moment of a conventional transmission resource within each preset GUL transmission period and an ending moment of an LBT detection space within the GUL transmission period of the shared UE is determined.

At step 112, a preset GUL transmission period, in which a conventional transmission resource related to the smallest time interval is located, is determined as a target GUL transmission period.

At step 113, the first type of retransmission alternative resource is determined for the shared UE according to a conventional transmission resource within the target GUL transmission period.

Exemplarily, it is assumed that there are two GUL transmission periods preset by the base station, e.g., a first GUL transmission period configured by the base station for shared terminal group G1, and, a second GUL transmission period configured by the base station for UE 7.

Figure 5:
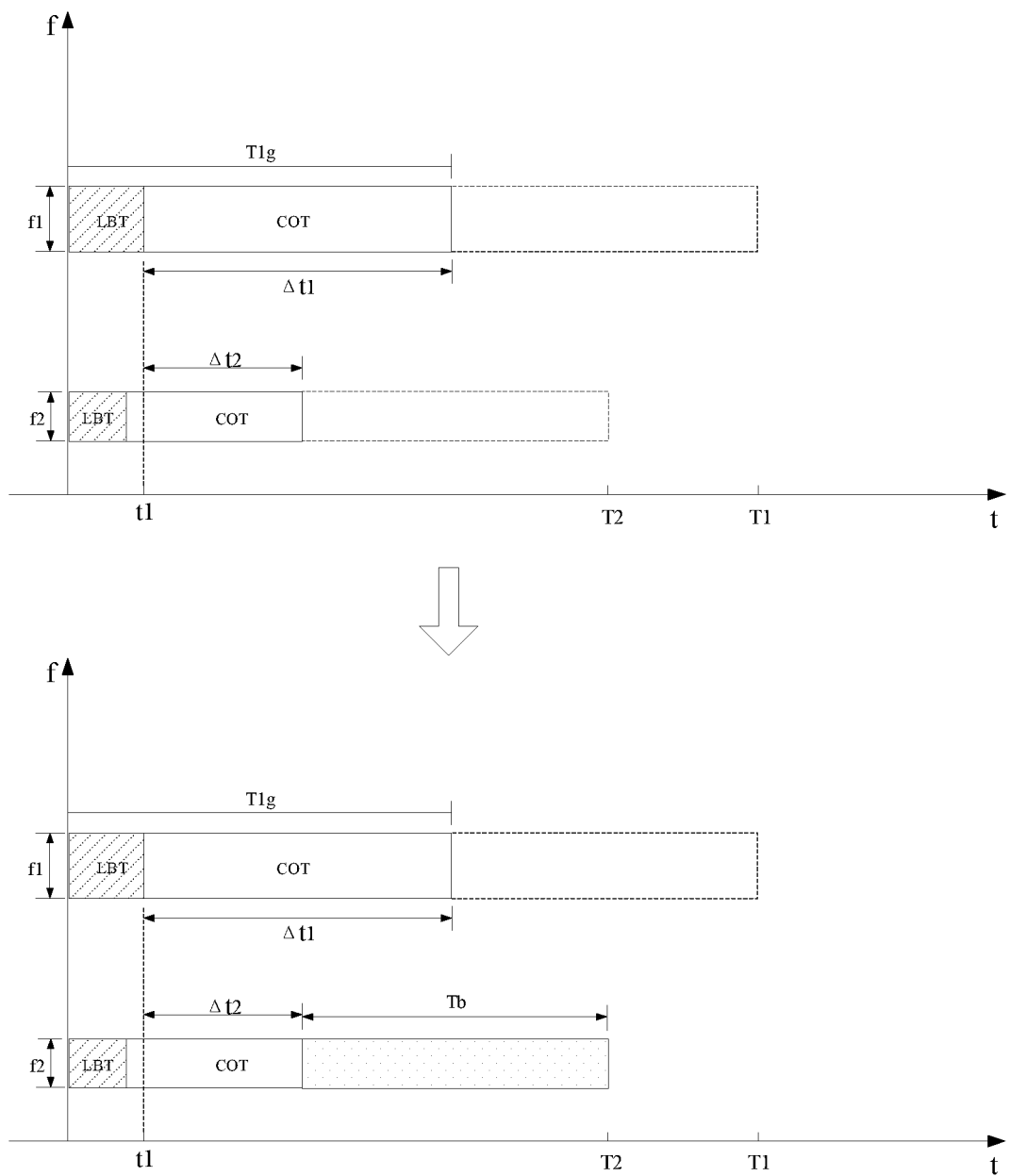
FIG. 5 is a schematic diagram illustrating an application scenario of information retransmission according to an embodiment of the present disclosure.

Referring to FIG. 5, which is a schematic diagram illustrating another scenario of retransmitting information according to an embodiment, a time-frequency range of the first GUL transmission period of the shared UE is (T1, f1); and a time-frequency range of the second GUL transmission period of the non-shared UE is (T2, f2). The ending moment of the LBT detection space within first GUL transmission period T1 is t1.

As shown in FIG. 5, a time interval between ending moment t1 of the LBT detection space within first GUL transmission period T1 and a starting moment of a conventional transmission resource within T1 is denoted as Δt1. A time interval between ending moment t1 of the LBT detection space within first GUL transmission period T1 and a starting moment of a conventional transmission resource in T2 is denoted as Δt2. Since Δt1 is greater than Δt2, for a shared UE that fails LBT detection in T1, such as UE 1, the earliest available conventional transmission resource is the conventional transmission resource in T2. Thus, T2 is determined to be the target GUL transmission period. From the perspective of minimizing the retransmission latency, the base station can configure the conventional transmission resource in T2 as the first type of retransmission alternative resource for UE 1.

Similarly, the base station may configure all or part of the conventional transmission resource in T2 as the first type of retransmission alternative resource. The embodiment shown in FIG. 5 is an example of configuring all of the conventional transmission resource in T2 as the first type of retransmission alternative resource for UE 1.

FIG. 5 shows a case where the starting moments of T1 and T2 are synchronized, and it should be noted that the method shown in FIG. 4 also applicable to a case where the two or more preset GUL transmission periods are not synchronized, which is not limited in the present disclosure.

In the embodiments of the present disclosure, without occupying more frequency resources in the unlicensed spectrum, the base station configures a conventional transmission resource within a preset GUL transmission period closest to the ending moment of the LBT detection space of the shared UE in the time domain as a first type of retransmission alternative resource for the shared UE, thereby effectively reducing the uplink retransmission latency of the shared UE.

In a second way, a retransmission alternative resource in a new frequency range is configured for a shared UE, that is, a second type of retransmission alternative resource.

Step 11 may be step B: the second type of retransmission alternative resource is configured for the shared UE in a target frequency range, where the target frequency range is different from a frequency range to which a preset GUL transmission period corresponds.

In this way, the base station can allocate a retransmission alternative resource for the shared UE within the target frequency range of an unlicensed spectrum which may be idle, thereby improving the reliability of the uplink retransmission of the shared UE.

In the present disclosure, the above step B may also include two implementations.

Implementation I: a periodic retransmission alternative resource is configured for the shared UE in the target frequency range, so as to obtain the second type of retransmission alternative resource.

In an embodiment, the second type of retransmission alternative resource determined by the base station using implementation I above may have an overlapping period in the time domain with a transmission space in the periodic uplink transmission resource of the shared UE, thereby reducing the uplink retransmission latency of the shared UE.

Figures 1, 6:
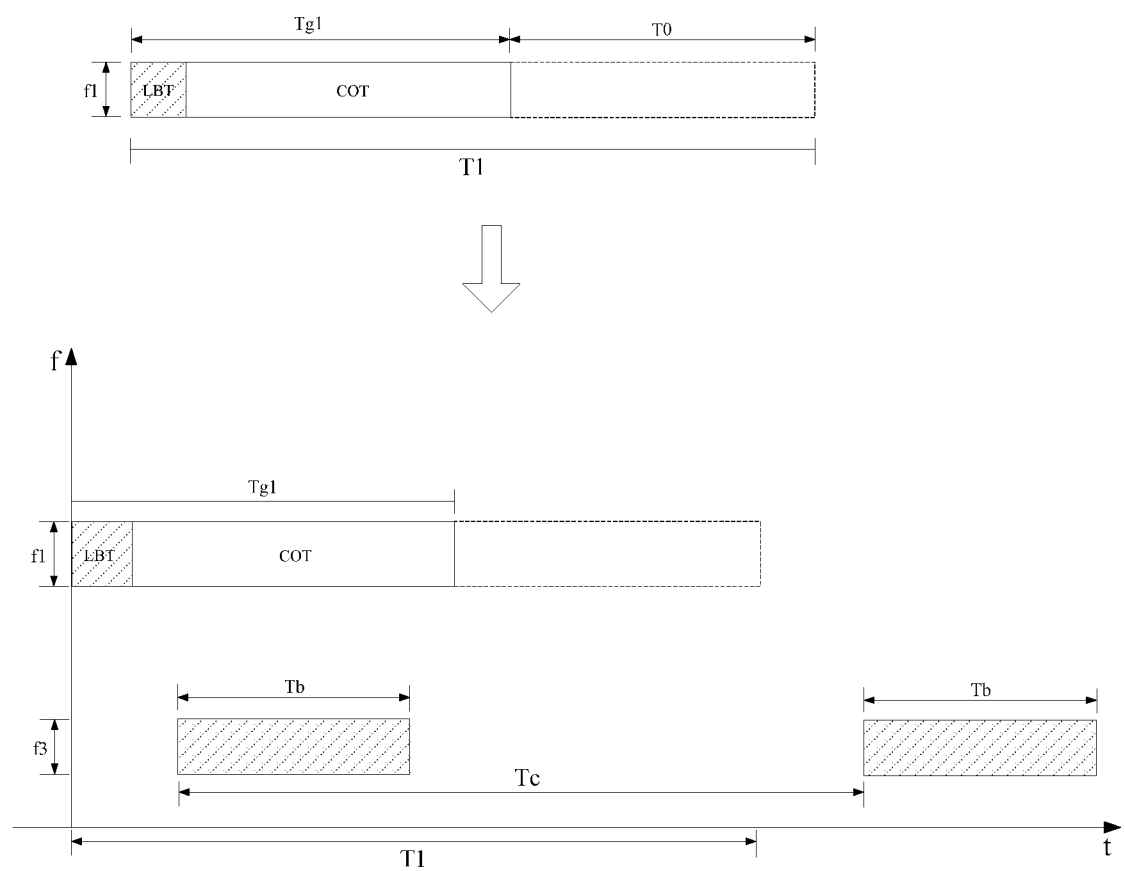
Figures 2, 6:
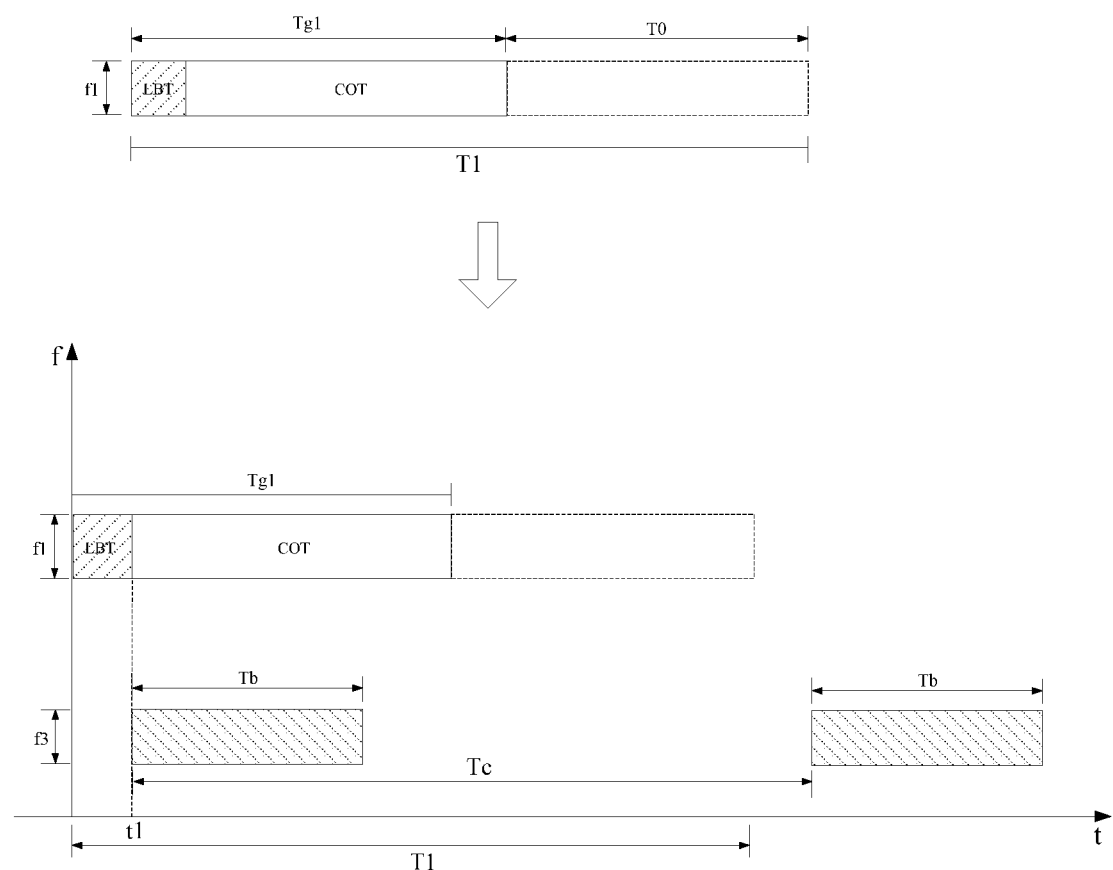
Figures 3, 6:
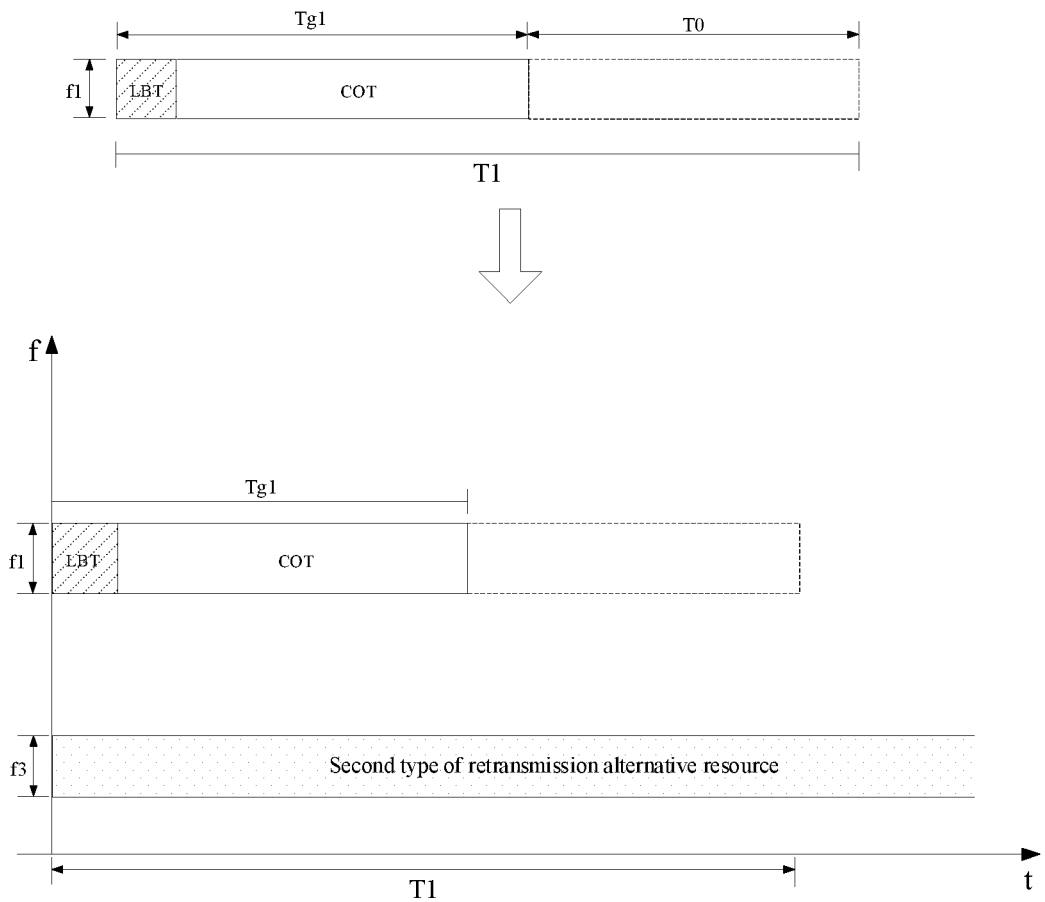

Referring to FIG. 6-1, a schematic diagram illustrating another scenario of retransmitting information according to an embodiment, still assuming that a time-frequency range of the first GUL transmission period of UE 1 is (T1, f1), the base station may configure periodic retransmission alternative resource Tb for UE 1 in new frequency range f3, where Tc represents a transmission period of the retransmission alternative resource.

In another embodiment of the present disclosure, the base station can synchronize a starting moment of the periodic retransmission alternative resource with ending moment t1 of the LBT detection space in the first GUL transmission period, as shown in FIG. 6-2. Thus, after UE 1 detects that the LBT detection fails, UE 1 may immediately find a retransmission alternative resource from target frequency range f3 for automatic uplink retransmission, which effectively reduces the uplink retransmission latency of UE 1.

Implementation II: a resource of a whole channel corresponding to the target frequency range is determined as the second type of retransmission alternative resource for the shared UE.

Referring to FIG. 6-3, which is a schematic diagram illustrating another scenario of retransmitting information according to an embodiment, the base station may set a resource of an entire channel corresponding to frequency range f3 as the second type of retransmission alternative resource, that is, the base station sets a dedicated retransmission channel for the shared UE.

In a third way, the base station can combine the above two ways and configure both the first type of retransmission alternative resource and the second type of retransmission alternative resource for one shared UE.

The base station may configure both of the above two types of retransmission alternative resources for the shared UE, such that the shared UE can automatically retransmit on different retransmission alternative resources after the LBT detection on the shared uplink transmission resource fails, thereby increasing success probability of the automatic uplink retransmission.

On the other hand, after the LBT detection on the shared uplink transmission resource fails, the shared UE may also prioritize which retransmission alternative resource to use for automatic uplink retransmission based on a service type of uplink data to be retransmitted, so as to meet different service transmission requirements.

Exemplarily, still taking the shared UE is UE 1 as an example. If current uplink data to be transmitted by UE 1 is URLLC (Ultra Reliable Low Latency Communication) service data, due to high transmission latency sensitivity requirements of the URLLC service data, UE 1 may prefer to use the second type of retransmission alternative resource, such as the base station configures the retransmission alternative resource for UE 1 in the new frequency range of the unlicensed spectrum as shown in FIG. 6-2. In this way, after UE 1 determines that the LBT detection fails, UE 1 may perform automatic retransmission using the retransmission alternative resource as soon as possible. If the current uplink data to be transmitted by UE 1 is mMTC (massive Machine Type Communication) service data, due to high reliability requirements for data transmission of mMTC service data, UE 1 may prefer to use the first type of retransmission alternative resource for uplink automatic retransmission, such as the retransmission alternative resource shown in FIG. 3-1 or FIG. 3-2, thereby ensuring the reliability of information retransmission.

At step 12, alternative resource configuration information is generated according to a time-frequency range of the retransmission alternative resource. The alternative resource configuration information is used to inform the shared UE about a time-frequency location of the retransmission alternative resource.

After determining the retransmission alternative resource for the shared UE, the base station may generate the alternative resource configuration information according to the time-frequency range of the retransmission alternative resource.

Depending on the retransmission alternative resource, information to be included in the alternative resource configuration information may be different. For example, for retransmission alternative resource Tb shown in FIG. 3-1 or FIG. 3-2, the base station may only inform UE 1 about a time domain location of the first type of retransmission alternative resource, which can save signaling overhead.

For the embodiment shown in FIG. 5, if UE 1 is informed about configuration information on T2 in advance, the base station can also only inform a time domain range of the first type of retransmission alternative resource, which can also save signaling overhead.

For the embodiment shown in FIG. 6-3, the base station can only inform UE 1 about a frequency range where the retransmission alternative resource is located, e.g., f3.

For the embodiment shown in FIG. 6-2, in the alternative resource configuration information, a starting moment of the second type of retransmission alternative resource may not be informed to UE 1, which also saves signaling overhead.

For the embodiment shown in FIG. 6-1, the alternative resource configuration information may include time domain location information and frequency domain location information on the second type of retransmission alternative resource.

In the present disclosure, the base station can configure the retransmission alternative resource to one shared UE or to multiple shared UEs. For example, for retransmission alternative resource Tb shown in FIG. 3-1 or FIG. 3-2, the base station may specify that UE 1 uses retransmission alternative resource Tb for automatic uplink retransmission in case of LBT detection failure; or the base station specifies that UE 1 and other UE share retransmission alternative resource Tb for automatic uplink retransmission. The other UE may be a shared UE sharing the same periodic uplink transmission resource with UE 1, such as UE 2 and UE 3 in shared terminal group G1, the other UE may also be a shared UE in other shared terminal group, which are not limited in the present disclosure.

In another embodiment of the present disclosure, if the base station configures that other UE is able to share the same retransmission alternative resource with UE 1, that is, the retransmission alternative resource is configured as a shared retransmission alternative resource for at least two UEs, the base station may also configure different LBT detection priorities for different shared UEs.

Figure 7:
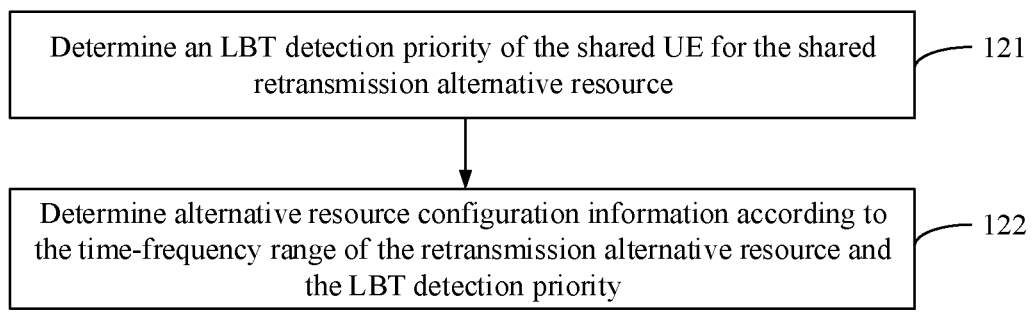
FIG. 7 is a flowchart illustrating another information retransmission method according to an embodiment of the present disclosure.

Referring to FIG. 7, a flowchart illustrating another information retransmission method according to an embodiment, step 12 may include the following.

At step 121, an LBT detection priority of a shared UE is determined for the shared retransmission alternative resource.

In an embodiment of the present disclosure, if the base station has explicitly indicated an LBT detection priority of each shared UE when configuring GUL transmission configuration information for shared terminal group G1, and while LBT detection priorities of different shared UEs are still distinguishable for a current shared retransmission alternative resource, the base station can follow previously configured LBT detection priorities for the shared UEs.

In another embodiment of the present disclosure, the base station does not configure LBT detection priorities for the shared UEs previously, or the previously configured LBT detection priority is invalid for the current shared retransmission alternative resource.

Taking two shared UEs as an example, assuming that the two shared UEs are from different shared terminal groups and are configured with the same LBT detection priority, the base station is unable to distinguish the LBT detection priorities against the shared retransmission alternative resource based on the LBT detection priorities previously configured for the two shared UEs.

Based on this, the base station may re-determine the LBT detection priorities for the at least two shared UEs, such that when all of the at least two shared UEs fail LBT detection and contend for the shared retransmission alternative resource at the same time, a retransmission collision event may be reduced, which ensures effective utilization of the shared retransmission resources.

The retransmission collision event refers to an event where at least two shared UEs both fail LBT detection during contending for their respective shared uplink transmission resources and need to perform automatic retransmission using the shared retransmission alternative resource at the same time. In the retransmission collision event, these pieces of automatic uplink retransmission all fail because the base station cannot correctly analyze information retransmitted by two or more UEs using the same retransmission alternative resource simultaneously, resulting in wasted transmission resources.

At step 122, the alternative resource configuration information is determined according to the time-frequency range of the retransmission alternative resource and the LBT detection priorities.

In the embodiments of the present disclosure, the alternative resource configuration information determined by the base station for the shared UE includes: time-frequency location information of the shared retransmission alternative resource and LBT detection priority indication information of each shared UE.

In the present disclosure, LBT detection priority indication information configured by the base station for a shared UE may include any one of the following.

A first indication information: the LBT detection priority indication information includes indication information on LBT start detection time of the shared UE.

For an LBT detection space of the retransmission alternative resource, the base station may configure a shared UE with a higher LBT detection priority to start LBT detection earlier, and a shared UE with a lower LBT detection priority having a delayed start detection time. Therefore, the base station can determine the indication information on the LBT start detection time for the shared retransmission alternative resource according to an LBT detection priority of a UE. The indication information on the LBT start detection time may include: specific time information, a preset time offset, a preset time index value indicating the start detection time, and other information.

A second indication information: the LBT detection priority indication information includes indication information on LBT start detection time of the shared UE and a preset CCA measurement value.

Regarding how a detecting party judges successful detection of an idle channel. In the related art, a device initiating LBT detection, such as a UE requiring to send data, randomly generates CCA measurement value N, which is a value for determining channel idleness, before detecting the channel idleness in an unlicensed spectrum. If a number of idle unit time-frequency resources detected in a given duration, e.g., an LBT detection space, is greater than or equal to N, a current channel is determined to be in an idle state within a preset duration according to a preset rule. Thus, a corresponding COT window can be determined, and data can be sent within the COT window, where the COT window may be referred to as a transmission space.

Regarding the first indication information, in some cases, for the shared retransmission alternative resource, although the LBT start detection time configured by the base station for each shared UE is different, when multiple shared UEs perform LBT detection on the shared retransmission alternative resource, since the CCA measurement value is a randomly generated value by each shared UE itself, a retransmission collision event may still occur if a CCA measurement value randomly generated by a shared UE with a delayed start detection time is smaller than a CCA measurement value randomly generated by a shared UE with an earlier start detection time.

In view of this, to more clearly distinguish the LBT detection priority of each shared UE for the shared retransmission alternative resource, in the embodiments of the present disclosure, the base station may also configure a fixed CCA measurement value for each shared UE, such that retransmission collision events can be avoid.

A third indication information: the LBT detection priority indication information includes a CCA measurement value of the shared UE.

In an embodiment of the present disclosure, when the base station configures the LBT detection priority of each shared UE for the shared retransmission alternative resource, the base station can also configure different CCA measurement values for different shared UEs, so as to effectively distinguish the LBT detection priority of each shared UE for the same shared retransmission alternative resource.

Exemplarily, the base station may configure a smaller CCA measurement value, such as 1 for a shared UE with a higher LBT detection priority, and configure a larger CCA measurement value for a shared UE with a lower LBT detection priority, such as 3.

Correspondingly, each shared UE starts to detect on the LBT detection space in the shared retransmission alternative resource at the same time, and since CCA measurement values Ns used to judge channel idleness are different, for example, a shared UE with a higher priority is configured with a smaller CCA measurement value, the shared UE with the higher priority will have priority for successful LBT detection and thus take priority for using the current shared retransmission alternative resource for retransmitting data, while other shared UEs back off the current retransmission opportunity.

At step 13, the alternative resource configuration information is sent to the shared UE, such that the shared UE performs automatic retransmission on the retransmission alternative resource according to the alternative resource configuration information after the shared UE fails LBT detection.

The base station may configure the retransmission alternative resource determined at step 11 to one shared UE in a shared terminal group, to all shared UEs in a shared terminal group, or to shared UEs in different shared terminal groups. Accordingly, the base station may notify the shared UE about the alternative resource configuration information in a unicast, multicast, or broadcast manner.

In the present disclosure, the base station may send the alternative resource configuration information in each embodiment to the shared UE using upper layer signaling or physical layer signaling, where the upper layer signaling may be RRC (Radio Resource Control) signaling, MAC (Medium Access Control) CE (Control Element) signaling.

Using the methods of retransmitting information provided by the present disclosure, a base station can configure a retransmission alternative resource for a shared UE, such that the shared UE can automatically retransmit uplink information using the retransmission alternative resource configured for itself by the base station after the shared UE fails LBT detection on a shared uplink transmission resource within a GUL transmission period. Thus, the base station is not required to separately schedule a retransmission resource for each LBT detection failure event of the shared UE, thereby effectively shortening uplink retransmission latency of the shared UE and reducing retransmission scheduling signaling overhead.

Figure 8:
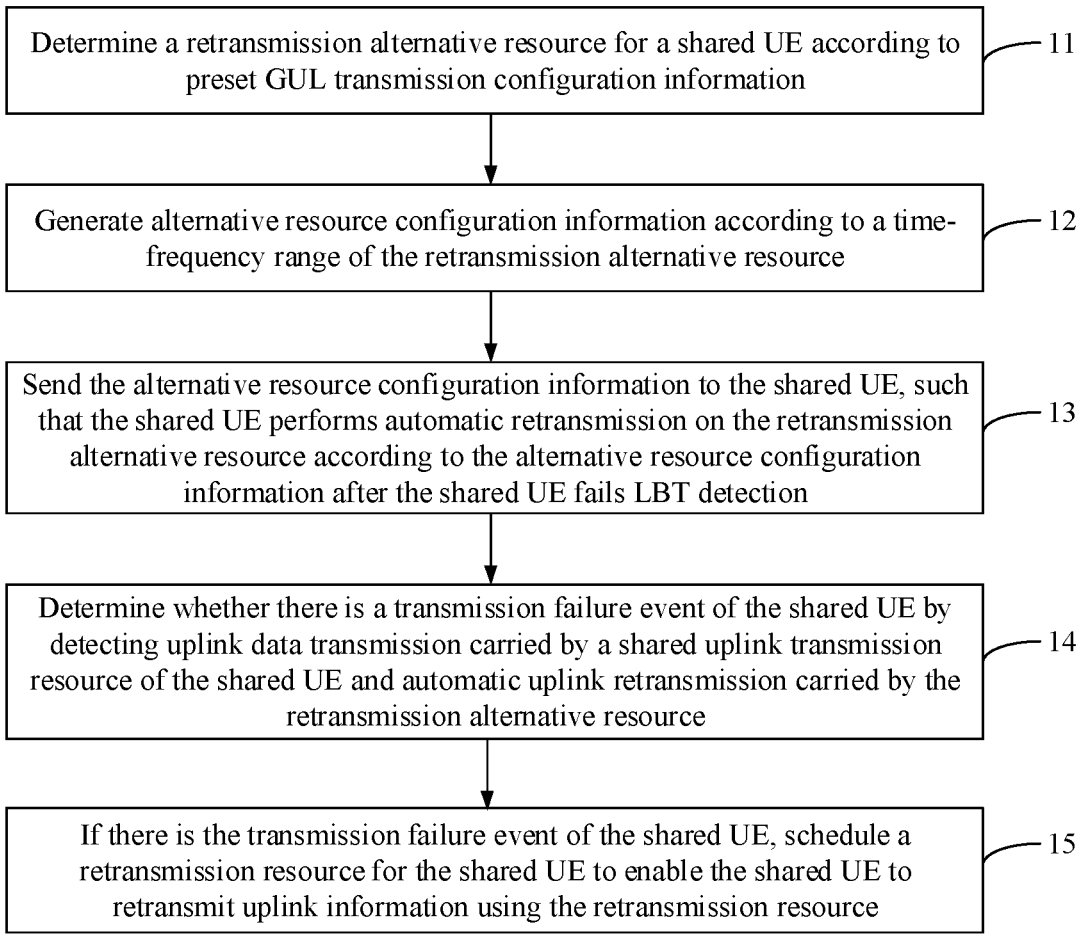
FIG. 8 is a flowchart illustrating another information retransmission method according to an embodiment of the present disclosure.

Referring to FIG. 8, a flowchart illustrating another information retransmission method according to an embodiment, the method further includes the following.

At step 14, whether there is a transmission failure event of the shared UE is determined by detecting uplink data transmission carried by the shared uplink transmission resource of the shared UE and automatic uplink retransmission carried by the retransmission alternative resource.

At step 15, if there is the transmission failure event of the shared UE, a retransmission resource for the shared UE is scheduled to enable the shared UE to retransmit uplink information using the retransmission resource.

As an example, the base station may, after UE 1 completes uplink transmission using both the shared uplink transmission resource and the retransmission alternative resource, analyze data carried by these resources to determine whether there is uplink data transmitted by UE 1. If there is no uplink data, it may mean that UE 1 has failed LBT detection on the retransmission alternative resource as well, i.e., there is a transmission failure event for UE 1. Then the base station can separately schedule a retransmission resource for UE 1 in accordance with the related art, such that UE 1 can complete uplink data retransmission using the retransmission resource scheduled by the base station.

In the embodiments of the present disclosure, the base station may further determine the transmission failure event of the shared UE based on uplink transmission data carried by the shared uplink transmission resource in the GUL transmission period and the retransmission alternative resource. In a case that a shared UE cannot complete automatic uplink retransmission using the retransmission alternative resource, the base station may schedule a retransmission resource for the share UE to ensure that uplink data to be transmitted of the shared UE can be transmitted smoothly using resources in an unlicensed spectrum, thereby improving the reliability of uplink information transmission by the shared UE the using unlicensed spectrum.

Correspondingly, the present disclosure also provides an information retransmission method applicable to a terminal. The terminal may be a shared terminal configured by a base station to share a periodic GUL transmission resource with other UEs, e.g., a shared UE mentioned above.

Figure 9:
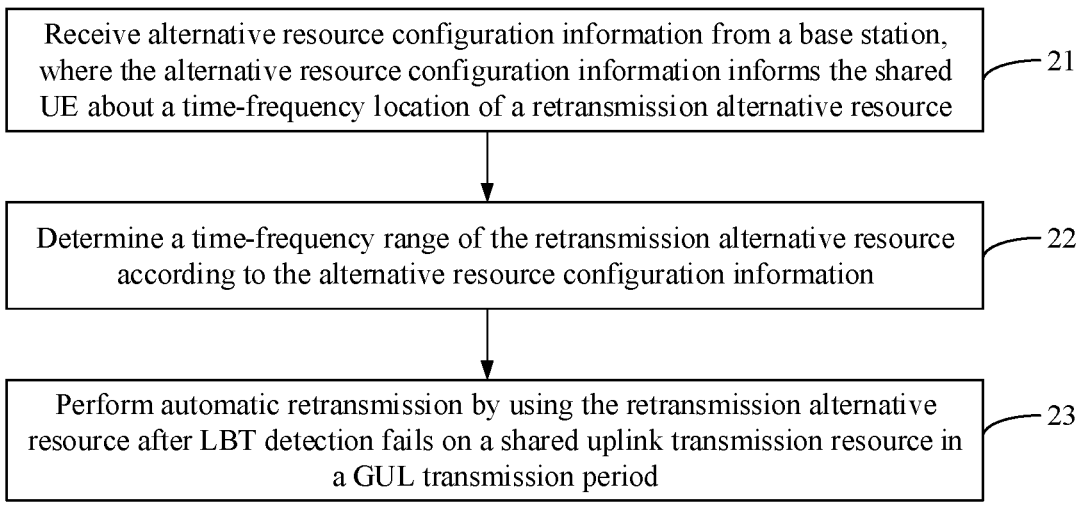
FIG. 9 is a flowchart illustrating an information retransmission method according to an embodiment of the present disclosure.

Referring to FIG. 9, a flowchart of an information retransmission method according to an embodiment, the method can include the following.

At step 21, alternative resource configuration information from a base station is received, where the alternative resource configuration information is used to inform a shared UE about a time-frequency location of a retransmission alternative resource.

The alternative resource configuration information includes at least time-frequency location information on the retransmission alternative resource.

At step 22, a time-frequency range of the retransmission alternative resource is determined according to the alternative resource configuration information.

In the present disclosure, the shared UE may, after receiving the alternative resource configuration information from the base station, or after LBT detection on a shared uplink transmission resource fails, use the alternative resource configuration information to determine the time-frequency location of the retransmission alternative resource for subsequent LBT detection on that retransmission alternative resource. After the subsequent LBT detection is successful, automatic retransmission can be performed.

At step 23, after LBT detection fails on a shared uplink transmission resource in a GUL transmission period, the retransmission alternative resource is used to perform automatic retransmission.

In the present disclosure, after the shared UE fails the LBT detection on the shared uplink transmission resource, the shared UE directly uses the retransmission alternative resource to implement the automatic uplink retransmission without requesting the base station to separately schedule a retransmission resource for the uplink retransmission, which saves signaling overhead.

Figure 10:
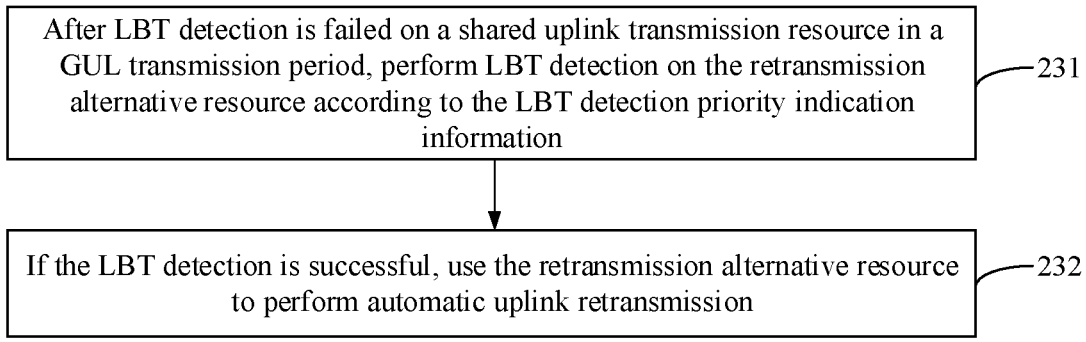
FIG. 10 is a flowchart illustrating another information retransmission method according to an embodiment of the present disclosure.

In another embodiment of the present disclosure, the alternative resource configuration information sent from the base station to the shared UE may also include: LBT detection priority indication information, which is used to indicate a detection priority for the shared UE performing LBT detection on the retransmission alternative resource. Referring to FIG. 10, a flowchart of another information retransmission method according to an embodiment, step 23 may include the following.

At step 231, LBT detection is performed on the retransmission alternative resource according to the LBT detection priority indication information after LBT detection is failed on the shared uplink transmission resource in the GUL transmission period.

Corresponding to different LBT detection priority indication information, implementations of step 231 may include the following.

In a first embodiment, the LBT detection priority indication information includes indication information on LBT start detection time.

Figure 11:
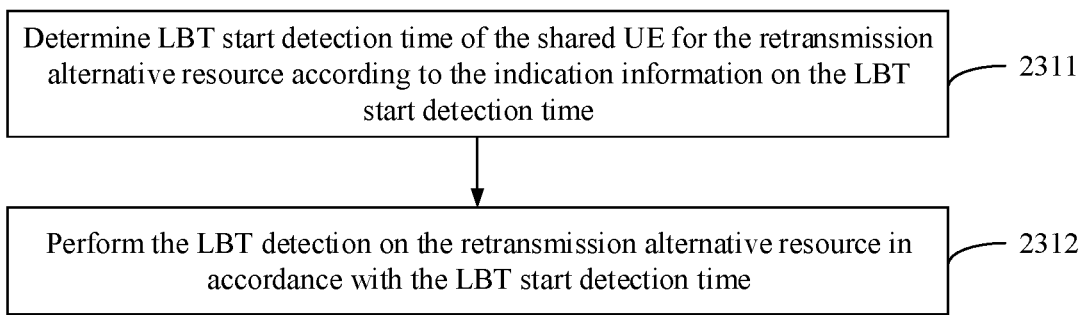
FIG. 11 is a flowchart illustrating another information retransmission method according to an embodiment of the present disclosure.

Referring to FIG. 11, a flowchart of another information retransmission method according to an embodiment, step 231 may include the following.

At step 2311, LBT start detection time of the shared UE for the retransmission alternative resource is determined according to the indication information on the LBT start detection time.

Depending on the presentation of the indication information on the LBT start detection time for the shared UE, the following manners of determining the LBT start detection time may be included.

Manner 1: if the indication information on the LBT start detection time is specific start time information, the specific start time information is directly determined as the LBT start detection time.

Manner 2: if the indication information on the LBT start detection time is a preset time offset, the shared UE determines the LBT start detection time based on a starting moment of the LBT detection space determined in advance and the preset time offset.

Manner 3: if the indication information on the LBT start detection time is a preset time index value representing the start detection time, step 2311 may include:

LBT start detection time corresponding to the preset time index value is determined by querying a preset list of detection time according to the preset time index value, where the preset list of detection time may be a system-agreed list including a correspondence between time index value and preset LBT start detection time.

At step 2312, the LBT detection is performed on the retransmission alternative resource in accordance with the LBT start detection time.

In the present disclosure, step 2312 can be implemented in two ways.

Figure 12:
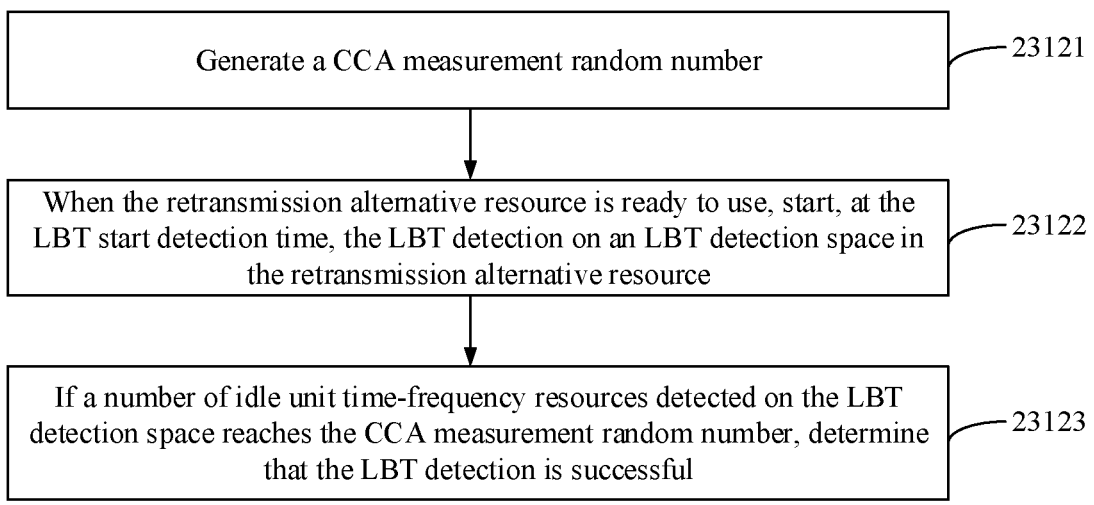
FIG. 12 is a flowchart illustrating another information retransmission method according to an embodiment of the present disclosure.

In a first way, referring to FIG. 12, a flowchart of another information retransmission method according to an example, step 2312 may include the following.

At step 23121, a CCA measurement random number is generated.

In the embodiments of the present disclosure, before starting the LBT detection on the retransmission alternative resource, the shared UE randomly generates a CCA measurement value, i.e., CCA measurement random number N, according to the related art, which can be an integer greater than or equal to 0, and a system-agreed value range may be [0, 32].

At step 23122, when the retransmission alternative resource is ready to use, LBT detection on an LBT detection space in the retransmission alternative resource is started at the LBT start detection time.

At step 23123, if a number of idle unit time-frequency resources detected on the LBT detection space reaches the CCA measurement random number, the LBT detection is determined to be successful.

Exemplarily, assuming that a shared UE such as UE 1 generates a CCA measurement random number as 2, UE 1 starts LBT detection on an LBT detection space within a retransmission alternative resource at preset LBT start detection time when the beginning of the retransmission alternative resource is arrived. If UE 1 detects that the number of idle unit time-frequency resources reaches 2 within the LBT detection space, UE 1 determines that the LBT detection is successful and then can occupy the current retransmission alternative resource for uplink automatic retransmission.

Conversely, if UE 1 detects that the number of idle unit time-frequency resources within the LBT detection space never reaches 2, which may be because other UE with a higher LBT detection priority has made successful detection and started data retransmission, UE 1 determines that the LBT detection fails and cannot use the current retransmission alternative resource for the automatic retransmission.

In a second way, the LBT detection priority indication information includes not only the indication information on the LBT start detection time, but also a preset CCA measurement value.

Figure 13:
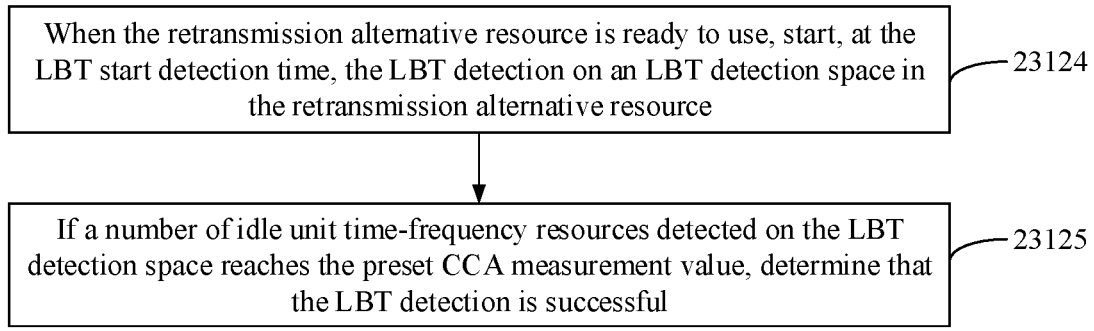
FIG. 13 is a flowchart illustrating another information retransmission method according to an embodiment of the present disclosure.

Referring to FIG. 13, a flowchart of another information retransmission method according to an example, step 2312 may include the following.

At step 23124, when the retransmission alternative resource is ready to use, LBT detection on an LBT detection space in the retransmission alternative resource is started at the LBT start detection time.

At step 23125, if a number of idle unit time-frequency resources detected on the LBT detection space reaches the preset CCA measurement value, the LBT detection is determined to be successful.

The difference between the two ways is that the preset CCA measurement value in this example is configured by the base station to the shared UE. The preset CCA measurement value is the same as a CCA measurement value configured by the base station to other shared UEs for this retransmission alternative resource. When there are two or more shared UEs contending for a retransmission alternative resource, since the LBT detection start time is different and the CCA measurement value is the same, a UE with a higher LBT detection priority can be more effectively guaranteed to implement successful LBT detection and occupy the shared retransmission alternative resource, thereby more effectively reducing the occurrence of a retransmission collision event.

In a second embodiment, the LBT detection priority indication information may include: a preset CCA measurement value of the shared UE.

Figure 14:
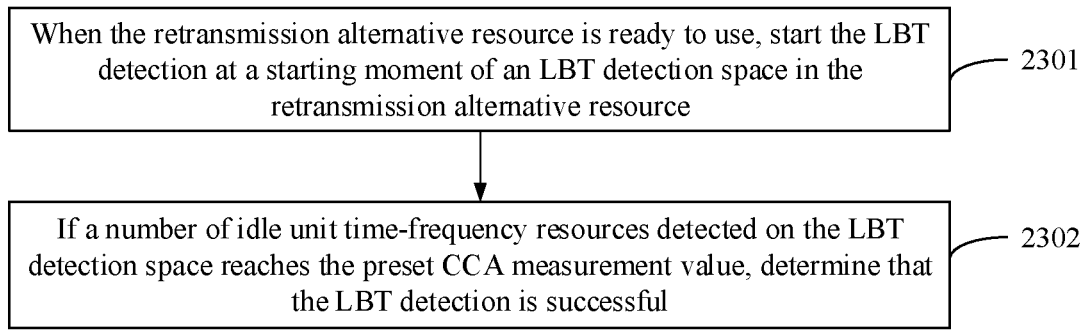
FIG. 14 is a flowchart illustrating another information retransmission method according to an embodiment of the present disclosure.

Referring to FIG. 14, a flowchart of another information retransmission method according to an example, step 231 may include the following.

At step 2301, when the retransmission alternative resource is ready to use, LBT detection is started at a starting moment of an LBT detection space in the retransmission alternative resource.

At step 2302, if a number of idle unit time-frequency resources detected on the LBT detection space reaches the preset CCA measurement value, the LBT detection is determined to be successful.

In the embodiment of the present disclosure, the base station configures different CCA measurement values for shared UEs that share the retransmission alternative resources. For a current shared UE such as UE 1, assuming that the CCA measurement value configured by the base station is 3. After UE 1 fails LBT detection on the shared uplink transmission resource, and when the beginning of the retransmission alternative resource is arrived, UE 1 start LBT detection on the LBT detection space in the retransmission alternative resource immediately at the beginning of the LBT detection space. If 3 idle unit time-frequency resources are detected, the LBT detection is determined to be successful. Otherwise, if less than 3 idle unit time-frequency resources are detected on the whole LBT detection space, LBT detection failure is determined. The reason of detection failure for UE 1 may be that a UE configured with a smaller CCA measurement value detects idle unit time-frequency resources corresponding to the smaller CCA measurement value earlier, and such UE takes priority to the current retransmission alternative resource.

At step 232, if the LBT detection on the retransmission alternative resource is successful, the retransmission alternative resource is used to perform automatic uplink retransmission.

For the method embodiments, for the sake of simplicity, all of them are described as a series of combinations of actions, but those skilled in the art should know that the present disclosure is not limited by the described sequence of actions, because some steps may be performed in other orders or simultaneously according to the present disclosure.

Secondly, those skilled in the art should also know that the embodiments described in the specification all belong to optional embodiments, and the operations and modules involved are not necessarily required in the present disclosure.

Corresponding to the method embodiments for implementing an application function, the present disclosure further provides embodiments of apparatuses for implementing the application function and a corresponding terminal.

Figure 15:
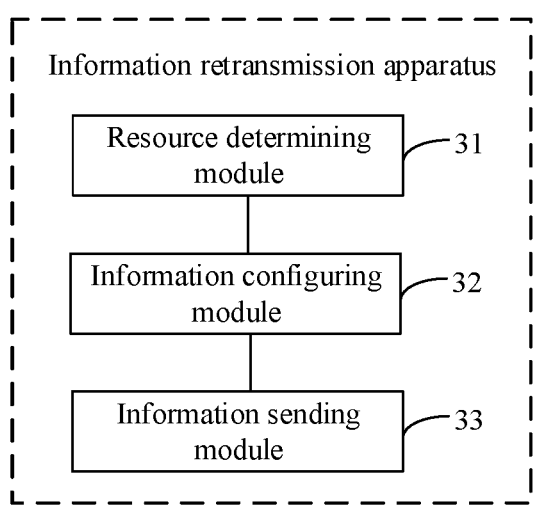
FIG. 15 is a block diagram illustrating an information retransmission apparatus according to an embodiment of the present disclosure.

Referring to FIG. 15, a block diagram of an information retransmission apparatus according to an embodiment, the apparatus can be set in a base station, and can include the following modules.

A resource determining module 31 is configured to determine a retransmission alternative resource for a shared UE according to preset GUL transmission configuration information, where the GUL transmission configuration information includes at least a time-frequency range associated with a GUL transmission period and a time-frequency location of a periodic uplink transmission resource, and the shared UE and other UE share a same periodic uplink transmission resource in an unlicensed spectrum to implement automatic uplink transmission.

An information configuring module 32 is configured to generate alternative resource configuration information according to a time-frequency range of the retransmission alternative resource, where the alternative resource configuration information informs the shared UE about a time-frequency location of the retransmission alternative resource.

An information sending module 33 is configured to send the alternative resource configuration information to the shared UE, such that the shared UE performs automatic retransmission on the retransmission alternative resource according to the alternative resource configuration information after the shared UE fails LBT detection.

Figure 16:
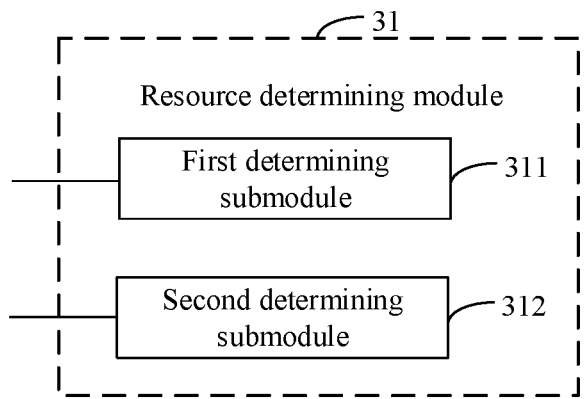
FIG. 16 is a block diagram illustrating another information retransmission apparatus according to an embodiment of the present disclosure.

Referring to FIG. 16, a block diagram of another information retransmission apparatus according to an embodiment, on the basis of the apparatus example shown in FIG. 15, the resource determining module 31 may include a first determining submodule 311 or a second determining submodule 312.

The first determining submodule 311 is configured to determine a first type of retransmission alternative resource for the shared UE according to a conventional transmission resource in a preset GUL transmission period.

The second determining submodule 312 is configured to configure a second type of retransmission alternative resource for the shared UE in a target frequency range, where the target frequency range is different from a frequency range to which the preset GUL transmission period corresponds.

In another apparatus embodiment of the present disclosure, the resource determining module 31 may include the first determining submodule 311 and the second determining submodule 312.

In an apparatus embodiment of the present disclosure, the first determining submodule 311 may be configured to determine the first type of retransmission alternative resource according to a conventional transmission resource in the GUL transmission period of the shared UE.

In another device embodiment of the present disclosure, the preset GUL transmission configuration information includes transmission configuration information about at least two preset GUL transmission periods.

Figure 17:
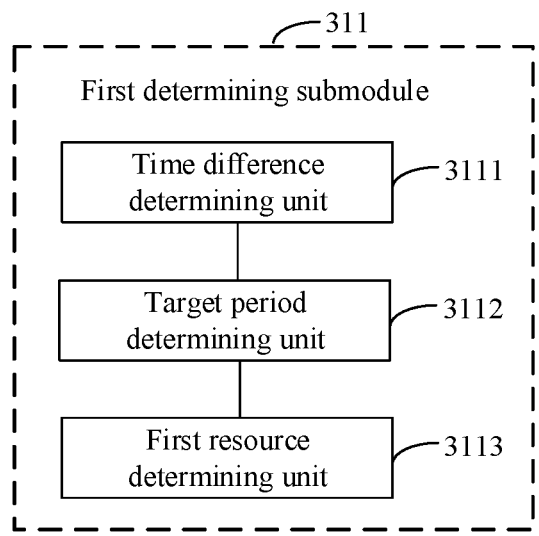
FIG. 17 is a block diagram illustrating another information retransmission apparatus according to an embodiment of the present disclosure.

Referring to FIG. 17, a block diagram of another information retransmission apparatus according to an embodiment, on the basis of the apparatus example shown in FIG. 16, the first determining submodule 311 may include the following units.

A time difference determining unit 3111 is configured to determine, for each of the at least two preset GUL transmission periods, a time interval between a starting moment of a conventional transmission resource within the preset GUL transmission period and an ending moment of an LBT detection space within the GUL transmission period of the shared UE.

A target period determining unit 3112 is configured to determine a preset GUL transmission period, in which a conventional transmission resource related to a smallest time interval is located, as a target GUL transmission period.

A first resource determining unit 3113 is configured to determine the first type of retransmission alternative resource for the shared UE according to a conventional transmission resource within the target GUL transmission period.

Figure 18:
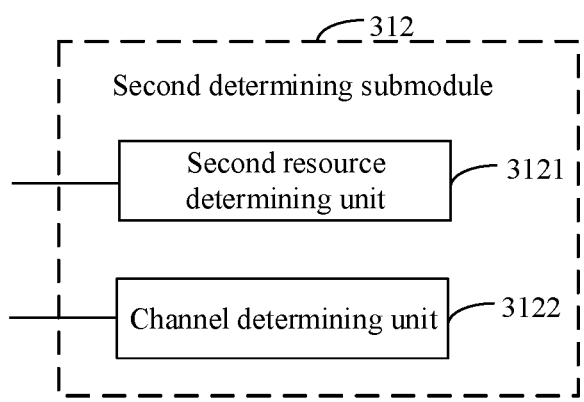
FIG. 18 is a block diagram illustrating another information retransmission apparatus according to an embodiment of the present disclosure.

Referring to FIG. 18, a block diagram of another information retransmission apparatus according to an embodiment, on the basis of the apparatus example shown in FIG. 16, the second determining submodule 312 may include a second resource determining unit 3121 or a channel determining unit 3122.

The second resource determining unit 3121 is configured to obtain the second type of retransmission alternative resources by configuring a periodic retransmission alternative resource for the shared UE in the target frequency range.

The channel determining unit 3122 is configured to determine a resource of a whole channel corresponding to the target frequency range as the second type of retransmission alternative resource for the shared UE.

In an apparatus embodiment of the present disclosure, the second type of retransmission alternative resource has an overlapping period in a time domain with a transmission space in the periodic uplink transmission resource of the shared UE.

In another apparatus embodiment of the present disclosure, a starting moment of the periodic retransmission alternative resource is the same as an ending moment of an LBT detection space within the GUL transmission period of the shared UE.

Figure 19:
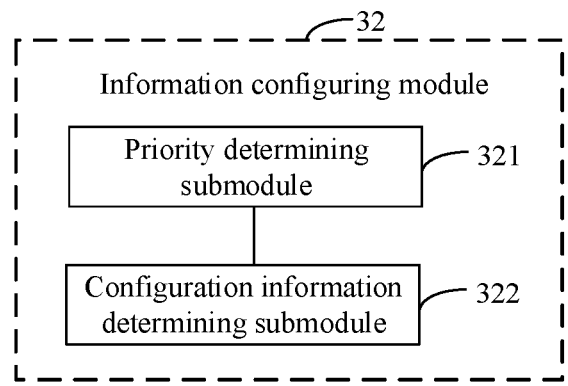
FIG. 19 is a block diagram illustrating another information retransmission apparatus according to an embodiment of the present disclosure.

In an apparatus embodiment of the present disclosure, if the retransmission alternative resource is configured as a shared retransmission alternative resource for at least two shared UEs; referring to FIG. 19, a block diagram of another information retransmission apparatus according to an embodiment, on the basis of the apparatus example shown in FIG. 15, the information configuring module 32 may include a priority determining submodule 321 and a configuration information determining submodule 322.

The priority determining submodule 321 is configured to determine an LBT detection priority of the shared UE for the shared retransmission alternative resource.

In an apparatus embodiment of the present disclosure, the LBT detection priority indication information determined by the priority determining submodule 321 may include:

indication information on LBT start detection time, or a CCA measurement value of the shared UE, where the CCA measurement value is an integer greater than or equal to zero.

In another apparatus embodiment of the present disclosure, the LBT detection priority indication information determined by the priority determining submodule 321 may include: indication information on LBT start detection time and a preset CCA measurement value.

The configuration information determining submodule 322 is configured to determine the alternative resource configuration information according to the time-frequency range of the retransmission alternative resource and the LBT detection priority.

The alternative resource configuration information includes: time-frequency location information of the shared retransmission alternative resource and LBT detection priority indication information of the shared UE.

Figure 20:
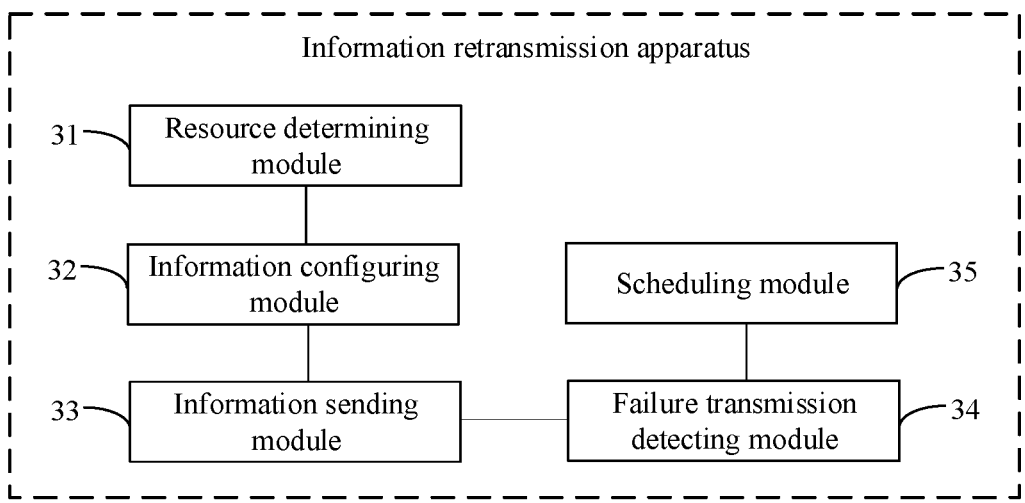
FIG. 20 is a block diagram illustrating another information retransmission apparatus according to an embodiment of the present disclosure.

Referring to FIG. 20, a block diagram of another information retransmission apparatus according to an embodiment, on the basis of the apparatus example shown in FIG. 15, the apparatus may further include the following modules.

A failure transmission detecting module 34 is configured to determine whether there is a transmission failure event of the shared UE by detecting uplink data transmission carried by a shared uplink transmission resource of the shared UE and automatic uplink retransmission carried by the retransmission alternative resource.

A scheduling module 35 is configured to schedule a retransmission resource for the shared UE to enable the shared UE to retransmit uplink information using the retransmission resource if there is the transmission failure event of the shared UE.

Correspondingly, the present disclosure also provides information retransmission apparatuses, which can be set in a shared UE. The shared UE and other UE share a same periodic uplink transmission resource in an unlicensed spectrum to implement automatic uplink transmission.

Figure 21:
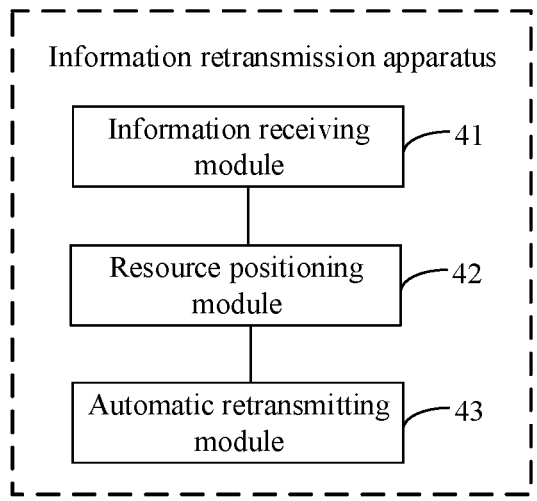
FIG. 21 is a block diagram illustrating an information retransmission apparatus according to an embodiment of the present disclosure.

Referring to FIG. 21, a block diagram of an information retransmission apparatus according to an embodiment, the apparatus may include the following modules.

An information receiving module 41 is configured to receive alternative resource configuration information from a base station, where the alternative resource configuration information informs the shared UE about a time-frequency location of a retransmission alternative resource.

A resource positioning module 42 is configured to determine a time-frequency range of the retransmission alternative resource according to the alternative resource configuration information.

An automatic retransmitting module 43 is configured to perform automatic retransmission by using the retransmission alternative resource after LBT detection fails on a shared uplink transmission resource in a GUL transmission period.

In an apparatus embodiment of the present disclosure, the alternative resource configuration information received by the information receiving module 41 may further include LBT detection priority indication information.

Figure 22:
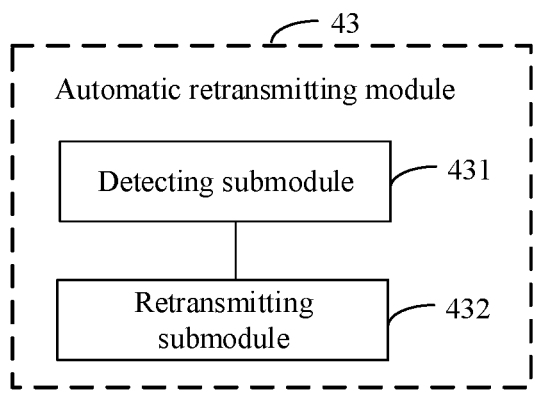
FIG. 22 is a block diagram illustrating another information retransmission apparatus according to an embodiment of the present disclosure.

Correspondingly, referring to FIG. 22, a block diagram of another information retransmission apparatus according to an embodiment, on the basis of the apparatus embodiment shown in FIG. 21, the automatic retransmitting module 43 may include the following submodule.

A detecting submodule 431 is perform LBT detection on the retransmission alternative resource according to the LBT detection priority indication information.

A retransmitting submodule 432 is configured to use the retransmission alternative resource to perform automatic uplink retransmission if the LBT detection is successful.

In an apparatus embodiment of the present disclosure, the LBT detection priority indication information received by the information receiving module 41 may include indication information on LBT start detection time.

Figure 23:
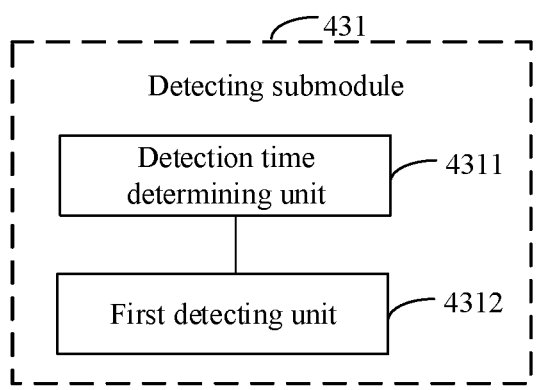
FIG. 23 is a block diagram illustrating another information retransmission apparatus according to an embodiment of the present disclosure.

Referring to FIG. 23, a block diagram of another information retransmission apparatus according to an embodiment, on the basis of the apparatus embodiment shown in FIG. 22, the detecting submodule 431 may include the following units.

A detection time determining unit 4311 is configured to determine LBT start detection time of the shared UE for the retransmission alternative resource according to the indication information on the LBT start detection time.

A first detecting unit 4312 is configured to perform the LBT detection on the retransmission alternative resource in accordance with the LBT start detection time.

Figure 24:
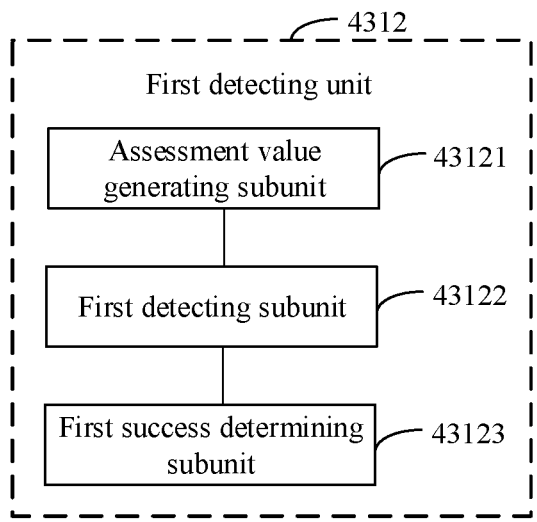
FIG. 24 is a block diagram illustrating another information retransmission apparatus according to an embodiment of the present disclosure.

Referring to FIG. 24, a block diagram of another information retransmission apparatus according to an embodiment, on the basis of the apparatus embodiment shown in FIG. 23, the first detecting unit 4312 may include the following subunits.

An assessment value generating subunit 43121 is configured to generate a CCA measurement random number.

A first detecting subunit 43122 is configured to start, at the LBT start detection time, the LBT detection on an LBT detection space in the retransmission alternative resource when the retransmission alternative resource is ready to use.

A first success determining subunit 43123 is configured to determine that the LBT detection is successful if a number of idle unit time-frequency resources detected on the LBT detection space reaches the CCA measurement random number.

In another apparatus embodiment of the present disclosure, the LBT detection priority indication information received by the information receiving module 41 may include indication information on LBT start detection time and a preset CCA measurement value. Based on this, referring to FIG. 25, a block diagram of another information retransmission apparatus according to an embodiment, on the basis of the apparatus embodiment shown in FIG. 23, the first detecting unit 4312 may include the following subunits.

A second detecting subunit 43124 is configured to start, at the LBT start detection time, the LBT detection on an LBT detection space in the retransmission alternative resource when the retransmission alternative resource is ready to use.

A second success determining subunit 43125 is configured to determine that the LBT detection is successful if a number of idle unit time-frequency resources detected on the LBT detection space reaches the preset CCA measurement value.

In another apparatus embodiment of the present disclosure, the LBT detection priority indication information received by the information receiving module 41 may include a preset CCA measurement value of the shared UE.

Figure 25:
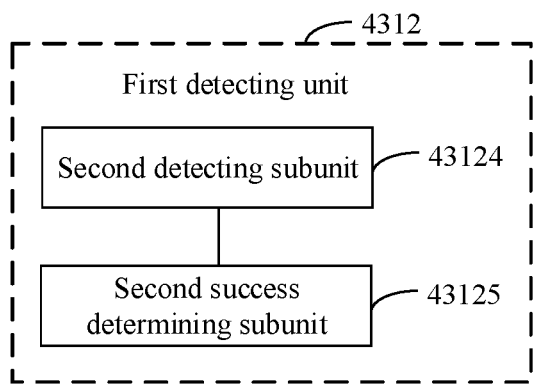
FIG. 25 is a block diagram illustrating another information retransmission apparatus according to an embodiment of the present disclosure.
Figure 26:
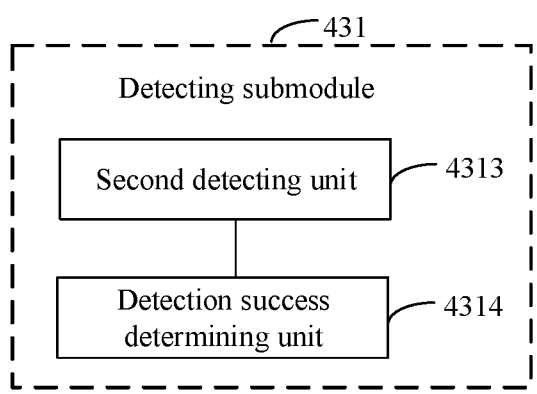
FIG. 26 is a block diagram illustrating another information retransmission apparatus according to an embodiment of the present disclosure.

Correspondingly, referring to FIG. 25, a block diagram of another information retransmission apparatus according to an embodiment, on the basis of the apparatus embodiment shown in FIG. 22, the detecting submodule 431 may include:

A second detecting unit 4313 is configured to start the LBT detection at a starting moment of an LBT detection space in the retransmission alternative resource when the retransmission alternative resource is ready to use.

A detection success determining unit 4314 is configured to determine that the LBT detection is successful if a number of idle unit time-frequency resources detected on the LBT detection space reaches the preset CCA measurement value.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

Correspondingly, a base station is provided on one hand, and the base station includes:
- a processor, and
- a memory for storing instructions executable by the processor,
- where the processor is configured to:
- determine a retransmission alternative resource for a shared UE according to preset GUL transmission configuration information, where the GUL transmission configuration information includes at least a time-frequency range associated with a GUL transmission period and a time-frequency location of a periodic uplink transmission resource, and the shared UE and other UE share a same periodic uplink transmission resource in an unlicensed spectrum to implement automatic uplink transmission;
- generate alternative resource configuration information according to a time-frequency range of the retransmission alternative resource, where the alternative resource configuration information informs the shared UE about a time-frequency location of the retransmission alternative resource; and
- send the alternative resource configuration information to the shared UE, such that the shared UE performs automatic retransmission on the retransmission alternative resource according to the alternative resource configuration information after the shared UE fails listen before talk LBT detection.

On the other hand, a terminal is provided, and the terminal includes:
- a processor, and
- a memory for storing instructions executable by the processor,
- where the processor is configured to:
- receive alternative resource configuration information from a base station, where the alternative resource configuration information informs the shared terminal about a time-frequency location of a retransmission alternative resource;
- determine a time-frequency range of the retransmission alternative resource according to the alternative resource configuration information; and
- perform automatic retransmission by using the retransmission alternative resource after LBT detection fails on a shared uplink transmission resource in a GUL transmission period.

Figure 27:
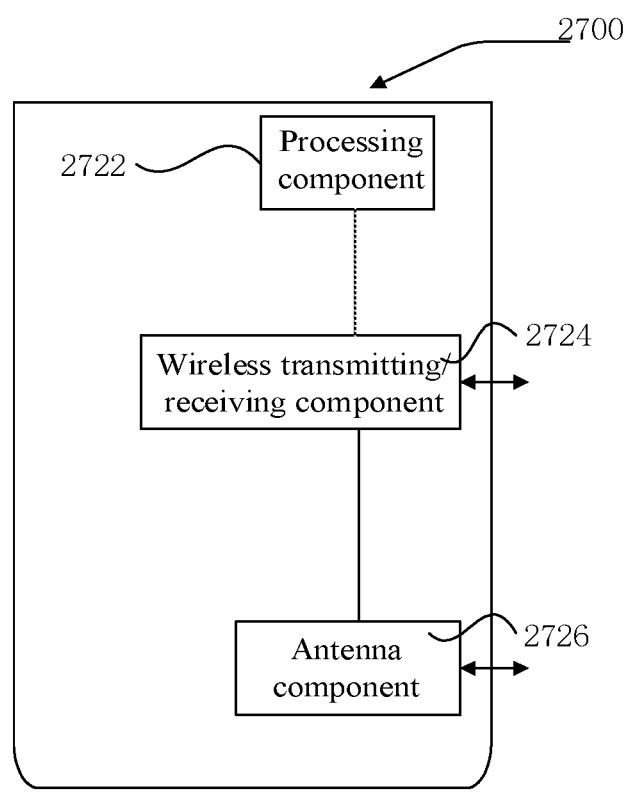
FIG. 27 is a schematic structural diagram illustrating a base station according to an embodiment of the present disclosure.

FIG. 27 is a schematic structural diagram of a base station 2700 according to an embodiment. As shown in FIG. 27, the base station 2700 includes a processing component 2722, a wireless transmitting/receiving component 2724, an antenna component 2726, and a signal processing part unique to a wireless interface. The processing component 2722 may further include one or more processors.

One of the processors in the processing component 2722 may be configured to:
- determine a retransmission alternative resource for a shared UE according to preset GUL transmission configuration information, where the GUL transmission configuration information includes at least a time-frequency range associated with a GUL transmission period and a time-frequency location of a periodic uplink transmission resource, and the shared UE and other UE share a same periodic uplink transmission resource in an unlicensed spectrum to implement automatic uplink transmission;
- generate alternative resource configuration information according to a time-frequency range of the retransmission alternative resource, where the alternative resource configuration information informs the shared UE about a time-frequency location of the retransmission alternative resource; and
- send the alternative resource configuration information to the shared UE, such that the shared UE performs automatic retransmission on the retransmission alternative resource according to the alternative resource configuration information after the shared UE fails listen before talk LBT detection.

In an embodiment, there is also provided a non-transitory machine-readable storage medium including instructions. The above instructions may be executed by the processing component 2722 of the apparatus 270000 to perform the above information retransmission methods shown in FIG. 1 to FIG. 8. For example, the non-transitory machine-readable storage medium may be a read only memory (ROM), a random access memory (RAM), a CD-ROM, a magnetic tape, a floppy disk, and an optical data storage device and so on.

Figure 28:
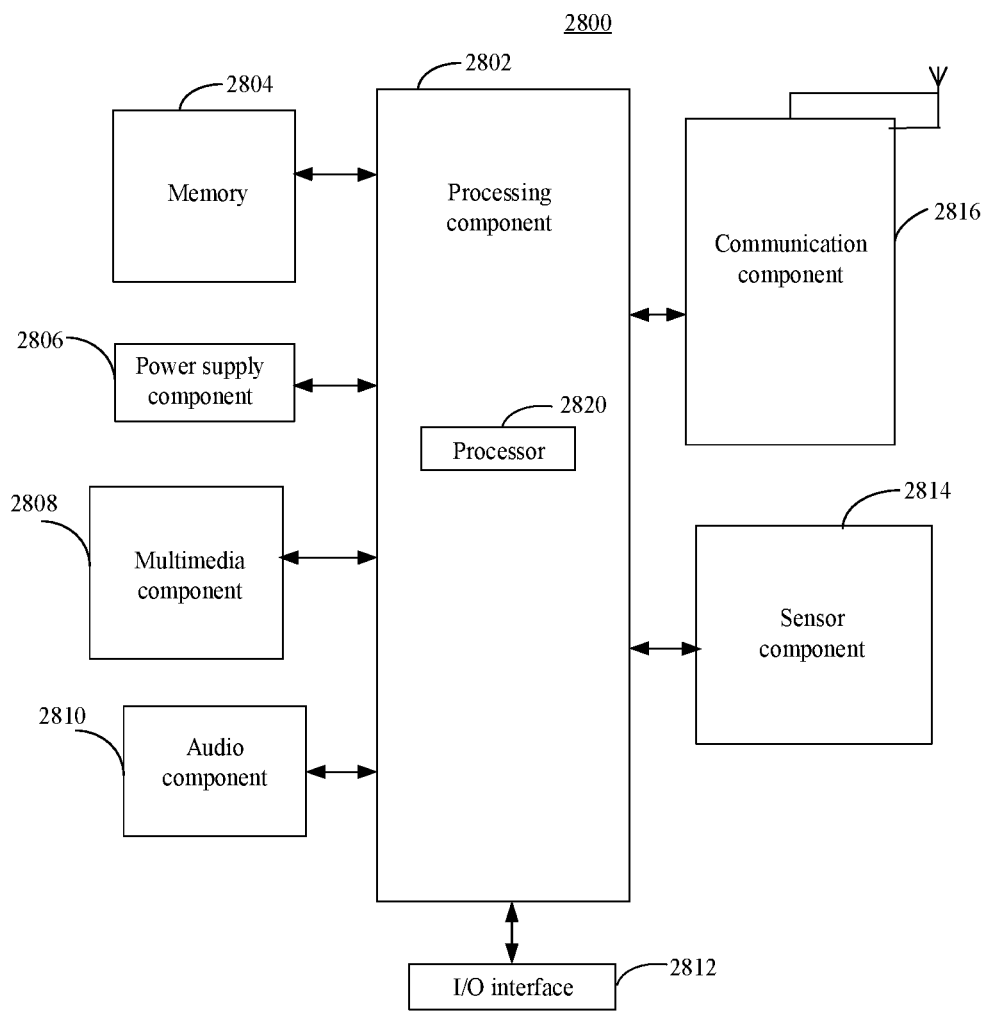
FIG. 28 is a schematic structural diagram illustrating a terminal according to an embodiment of the present disclosure.

FIG. 28 is a schematic structural diagram of a terminal 2800 according to an embodiment. For example, the terminal 2800 may be a UE, such as a mobile phone, a computer, a digital broadcast terminal, a messaging transceiver, a game console, a tablet device, a medical device, a fitness device, a personal digital assistant, and wearable devices such as smart watches and smart glasses, smart bracelets, smart running shoes, etc.

As shown in FIG. 28, the apparatus 2800 may include one or more of the following components: a processing component 2802, a memory 2804, a power supply component 2806, a multimedia component 2808, an audio component 2810, an input/output (I/O) interface 2812, a sensor component 2814, and a communication component 2816.

The processing component 2802 generally controls overall operations of the apparatus 2800, such as operations associated with display, phone calls, data communications, camera operations, and recording operations. The processing component 2802 may include one or more processors 2820 for executing instructions to complete all or a part of steps of the above method. In addition, the processing component 2802 may include one or more modules which facilitate the interaction between the processing component 2802 and other components. For example, the processing component 2802 may include a multimedia module to facilitate the interaction between the multimedia component 2808 and the processing component 2802.

The memory 2804 may be configured to store various types of data to support the operation of the apparatus 2800. Examples of such data include instructions for any application or method operated on the apparatus 2800, contact data, phonebook data, messages, pictures, videos, and so on. The memory 2804 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic, or compact disk.

The power supply component 2806 may provide power to different components of the apparatus 2800. The power supply component 2806 may include a power management system, one or more power supplies and other components associated with generating, managing, and distributing power for the apparatus 2800.

The multimedia component 2808 may include a screen providing an output interface between the apparatus 2800 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 2808 may include a front camera and/or a rear camera. The front camera and/or rear camera may receive external multimedia data when the apparatus 2800 is in an operating mode, such as a photographing mode or a video mode. Each of the front camera and the rear camera may be a fixed optical lens system or have focal length and optical zooming capability.

The audio component 2810 may be configured to output and/or input an audio signal. For example, the audio component 2810 may include a microphone (MIC) configured to receive an external audio signal when the apparatus 2800 is in an operating mode, such as a call mode, a recording mode, and a voice recognition mode. The received audio signal may be further stored in the memory 2804 or sent via the communication component 2816. In some examples, the audio component 2810 further includes a speaker to output an audio signal.

The I/O interface 2812 provides an interface between the processing component 2802 and peripheral interface modules. The above peripheral interface modules may be a keyboard, a click wheel, buttons, and so on. These buttons may include, but are not limited to, a home button, a volume button, a starting button, and a locking button.

The sensor component 2814 may include one or more sensors to provide status assessments of various aspects for the apparatus 2800. For example, the sensor component 2814 may detect an on/off state of the apparatus 2800, and relative positioning of component, for example, the component is a display and a mini-keypad of the apparatus 2800. The sensor component 2814 may also detect a change in position of the apparatus 2800 or a component of the apparatus 2800, a presence or absence of the contact between a user and the apparatus 2800, an orientation or an acceleration/deceleration of the apparatus 2800, and a change in temperature of the apparatus 2800. The sensor component 2814 may include a proximity sensor configured to detect the presence of a nearby object without any physical contact. The sensor component 2814 may further include an optical sensor, such as a CMOS or CCD image sensor which is used in imaging applications. In some examples, the sensor component 2814 may further include an acceleration sensor, a gyroscope sensor, a magnetic sensor, a pressure sensor, or a temperature sensor.

The communication component 2816 may be configured to facilitate wired or wireless communication between the apparatus 2800 and other devices. The apparatus 2800 may access a wireless network that is based on a communication standard, such as Wi-Fi, 2G, 3G, 4G LTE, 5G NR or a combination thereof. In an example, the communication component 2816 receives broadcast signals or broadcast-associated information from an external broadcast management system via a broadcast channel. In an example, the communication component 2816 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the apparatus 2800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the above methods.

In an example, there is also provided a non-transitory machine-readable storage medium including instructions, such as the memory 2804 including instructions. The above instructions may be executed by the processor 2820 of the apparatus 2800 to perform the above information retransmission methods shown in FIG. 9 to FIG. 14. For example, the non-transitory machine-readable storage medium may be a ROM, a RAM, a CD-ROM, a magnetic tape, a floppy disk, and an optical data storage device and so on.

Other implementations of the present disclosure will be apparent to those skilled in the art from consideration of the specification and practice of the present disclosure herein. The present disclosure is intended to cover any variations, usages, or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. An information retransmission method, comprising:
   determining, by a base station, a retransmission alternative resource for a shared user equipment (UE) according to preset grant-free uplink (GUL) transmission configuration information, wherein the GUL transmission configuration information comprises at least a time-frequency range associated with a GUL transmission period and a time-frequency location of a periodic uplink transmission resource, and the shared UE and other UE share a same periodic uplink transmission resource in an unlicensed spectrum to implement automatic uplink transmission;
   generating, by the base station, alternative resource configuration information according to a time-frequency range of the retransmission alternative resource, wherein the alternative resource configuration information informs the shared UE about a time-frequency location of the retransmission alternative resource; and
   sending, by the base station, the alternative resource configuration information to the shared UE, such that the shared UE performs automatic retransmission on the retransmission alternative resource according to the alternative resource configuration information after the shared UE fails listen before talk (LBT) detection;
   wherein in response to determining that the retransmission alternative resource is configured as a shared retransmission alternative resource for at least two shared UEs,
   generating the alternative resource configuration information according to the time-frequency range of the retransmission alternative resource comprises:
   for each of the at least two shared UEs,
   determining an LBT detection priority of the shared UE for the shared retransmission alternative resource; and
   determining alternative resource configuration information of the shared UE according to the time-frequency range of the retransmission alternative resource and the LBT detection priority;
   wherein the alternative resource configuration information of the shared UE comprises: time-frequency location information of the shared retransmission alternative resource and LBT detection priority indication information of the shared UE.

2. The method according to claim 1, wherein determining the retransmission alternative resource for the shared UE according to the preset GUL transmission configuration information comprises:
   determining a first type of retransmission alternative resource for the shared UE according to a conventional transmission resource in a preset GUL transmission period; or
   configuring a second type of retransmission alternative resource for the shared UE in a target frequency range, wherein the target frequency range is different from a frequency range to which the GUL transmission period corresponds.

3. The method according to claim 2, wherein determining the first type of retransmission alternative resource for the shared UE according to the conventional transmission resource in the preset GUL transmission period comprises:
   determining the first type of retransmission alternative resource according to a conventional transmission resource in the GUL transmission period of the shared UE.

4. The method according to claim 2, wherein the preset GUL transmission configuration information comprises transmission configuration information about at least two preset GUL transmission periods; and
   wherein determining the first type of retransmission alternative resource for the shared UE according to the conventional transmission resource in the preset GUL transmission period comprises:
   for each of the at least two preset GUL transmission periods, determining a time interval between a starting moment of a conventional transmission resource within the preset GUL transmission period and an ending moment of an LBT detection space within the GUL transmission period of the shared UE;
   determining a preset GUL transmission period as a target GUL transmission period, wherein a conventional transmission resource related to a smallest time interval is located in the preset GUL transmission period; and
   determining the first type of retransmission alternative resource for the shared UE according to the conventional transmission resource within the target GUL transmission period.

5. The method according to claim 2, wherein configuring the second type of retransmission alternative resource for the shared UE in the target frequency range comprises:
   obtaining the second type of retransmission alternative resources by configuring a periodic retransmission alternative resource for the shared UE in the target frequency range; or
   determining a resource of a whole channel corresponding to the target frequency range as the second type of retransmission alternative resource for the shared UE.

6. The method according to claim 5, wherein the second type of retransmission alternative resource has an overlapping period in a time domain with a transmission space in the periodic uplink transmission resource of the shared UE.

7. The method according to claim 6, wherein a starting moment of the periodic retransmission alternative resource is the same as an ending moment of an LBT detection space within the GUL transmission period of the shared UE.

8. The method according to claim 1, wherein the LBT detection priority indication information comprises:

indication information on LBT start detection time of the shared UE, or a clear channel assessment (CCA) measurement value of the shared UE, wherein the CCA measurement value is an integer greater than or equal to zero.

9. The method according to claim 1, wherein the LBT detection priority indication information comprises:
indication information on LBT start detection time of the shared UE and a preset clear channel assessment (CCA) measurement value.

10. The method according to claim 1, further comprising:
determining whether there is a transmission failure event of the shared UE by detecting uplink data transmission carried by a shared uplink transmission resource of the shared UE and automatic uplink retransmission carried by the retransmission alternative resource; and
in response to determining that there is the transmission failure event of the shared UE, scheduling a retransmission resource for the shared UE to enable the shared UE to retransmit uplink information using the retransmission resource.

11. An information retransmission method, comprising:
receiving, by a shared user equipment (UE), alternative resource configuration information from a base station, wherein the alternative resource configuration information informs the shared UE about a time-frequency location of a retransmission alternative resource, the shared UE and other UE share a same periodic uplink transmission resource in an unlicensed spectrum to implement automatic uplink transmission;
determining, by the shared UE, a time-frequency range of the retransmission alternative resource according to the alternative resource configuration information; and
performing, by the shared UE, automatic retransmission by using the retransmission alternative resource after listen before talk (LBT) detection fails on a shared uplink transmission resource in a grant-free uplink (GUL) transmission period;
wherein the alternative resource configuration information further comprises: LBT detection priority indication information, comprising indication information on LBT start detection time or a preset clear channel assessment (CCA) measurement value of the shared UE; and
wherein performing the automatic retransmission by using the retransmission alternative resource comprises:
performing new LBT detection on the retransmission alternative resource according to the LBT detection priority indication information; and
in response to determining that the new LBT detection is successful, performing automatic uplink retransmission by using the retransmission alternative resource.

12. The method according to claim 11, wherein in response to determining that the LBT detection priority indication information comprises the indication information on the LBT start detection time; and
wherein performing the new LBT detection on the retransmission alternative resource according to the LBT detection priority indication information comprises:
determining LBT start detection time of the shared UE for the retransmission alternative resource according to the indication information on the LBT start detection time; and
performing the new LBT detection on the retransmission alternative resource in accordance with the determined LBT start detection time.

13. The method according to claim 12, wherein performing the new LBT detection on the retransmission alternative resource in accordance with the determined LBT start detection time comprises:
generating a clear channel assessment (CCA) measurement random number;
in response to determining that the retransmission alternative resource is ready to use, starting, at the determined LBT start detection time, the new LBT detection on an LBT detection space in the retransmission alternative resource; and
in response to determining that a number of idle unit time-frequency resources detected on the LBT detection space reaches the CCA measurement random number, determining that the new LBT detection is successful.

14. The method according to claim 12, wherein the LBT detection priority indication information further comprises a preset clear channel assessment (CCA) measurement value; and
wherein performing the new LBT detection on the retransmission alternative resource in accordance with the determined LBT start detection time comprises:
in response to determining that the retransmission alternative resource is ready to use, starting, at the determined LBT start detection time, the new LBT detection on an LBT detection space in the retransmission alternative resource; and
in response to determining that a number of idle unit time-frequency resources detected on the LBT detection space reaches the preset CCA measurement value, determining that the new LBT detection is successful.

15. The method according to claim 11, wherein in response to determining that the LBT detection priority indication information comprises the preset CCA measurement value of the shared UE; and
wherein performing the new LBT detection on the retransmission alternative resource according to the LBT detection priority indication information comprises:
in response to determining that the retransmission alternative resource is ready to use, starting the new LBT detection at a starting moment of an LBT detection space in the retransmission alternative resource; and
in response to determining that a number of idle unit time-frequency resources detected on the LBT detection space reaches the preset CCA measurement value, determining that the new LBT detection is successful.

16. A shared terminal, comprising:
a processor, and
a memory for storing instructions executable by the processor,
wherein the processor is configured to implement the method according to claim 11.

17. A base station, comprising:
a processor, and
a memory for storing instructions executable by the processor,
wherein the processor is configured to:
determine a retransmission alternative resource for a shared user equipment (UE) according to preset grant-free uplink (GUL) transmission configuration information, wherein the GUL transmission configuration information comprises at least a time-frequency range associated with a GUL transmission period and a time-frequency location of a periodic uplink transmission resource, and the shared UE and other UE share a same periodic uplink transmission resource in an unlicensed spectrum to implement automatic uplink transmission;

generate alternative resource configuration information according to a time-frequency range of the retransmission alternative resource, wherein the alternative resource configuration information informs the shared UE about a time-frequency location of the retransmission alternative resource; and send the alternative resource configuration information to the shared UE, such that the shared UE performs automatic retransmission on the retransmission alternative resource according to the alternative resource configuration information after the shared UE fails listen before talk (LBT) detection;

wherein in response to determining that the retransmission alternative resource is configured as a shared retransmission alternative resource for at least two shared UEs, generating the alternative resource configuration information according to the time-frequency range of the retransmission alternative resource comprises:

for each of the at least two shared UEs, determining an LBT detection priority of the shared UE for the shared retransmission alternative resource; and determining alternative resource configuration information of the shared UE according to the time-frequency range of the retransmission alternative resource and the LBT detection priority;

wherein the alternative resource configuration information of the shared UE comprises: time-frequency location information of the shared retransmission alternative resource and LBT detection priority indication information of the shared UE.

* * * * *